(12) United States Patent
Shih et al.

(10) Patent No.: US 11,589,294 B2
(45) Date of Patent: Feb. 21, 2023

(54) METHOD AND APPARATUS FOR CELL RESERVATION AND ACCESS RESTRICTION

(71) Applicant: FG Innovation Company Limited, Tuen Mun (HK)

(72) Inventors: Mei-Ju Shih, Taipei (TW); Yung-Lan Tseng, Taipei (TW); Hung-Chen Chen, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/084,598

(22) Filed: Oct. 29, 2020

(65) Prior Publication Data

US 2021/0127325 A1 Apr. 29, 2021

Related U.S. Application Data

(60) Provisional application No. 62/927,479, filed on Oct. 29, 2019.

(51) Int. Cl.
*H04W 48/16* (2009.01)
*H04W 88/02* (2009.01)

(52) U.S. Cl.
CPC ............ *H04W 48/16* (2013.01); *H04W 88/02* (2013.01)

(58) Field of Classification Search
CPC ..... H04W 48/16; H04W 88/02; H04W 48/12; H04W 48/20; H04W 48/02
See application file for complete search history.

(56) References Cited

U.S. PATENT DOCUMENTS

2019/0274096 A1 9/2019 Ingale et al.
2021/0400552 A1* 12/2021 Shih ...................... H04W 48/16

FOREIGN PATENT DOCUMENTS

CN 110024442 A 7/2019
EP 2603019 A1 6/2013

OTHER PUBLICATIONS

Samsung Electronics, Correction to UE behavior for barred cell, R2-1818998 3GPP TSG-RAN2 104, Spokane, USA, Nov. 12-16, 2018.
Nokia, Nokia Shanghai Bell, Preventing non-NPN UEs from selecting NPN cells, R2-1909310 3GPP TSG-RAN WG2 Meeting #107, Prague, Czech Republic, Aug. 26-30, 2019.

(Continued)

*Primary Examiner* — Diane D Mizrahi
(74) *Attorney, Agent, or Firm* — ScienBiziP, P.C.

(57) ABSTRACT

A method for wireless communication performed by a user equipment (UE) is provided. The method includes: receiving a master information block (MIB) from a cell, the MIB including a cell barred information element (IE); receiving a system information block type 1 (SIB1) from the cell, the SIB1 including a first non-public network (NPN) identity (ID), a first cell reserved for operator use IE associated with the first NPN ID, and a cell reserved for other use IE; and determining to treat the cell as a candidate cell for cell selection or cell reselection procedures when the cell barred IE is "not barred", the cell reserved for other use IE is not "true", the first cell reserved for operator use IE is "reserved", the first NPN ID matches a registered standalone NPN (SNPN) ID of the UE, and an access ID of the UE is 11 or 15.

20 Claims, 4 Drawing Sheets

(56) References Cited

OTHER PUBLICATIONS

ZTE Corporation, Sanechips, Consideration on the System Information of the Private Network, R2-1909267 3GPP TSG-RAN WG2 Meeting#107, Prague, Czech, Aug. 26-30, 2019.

Huawei et al., "Discussion on RAN sharing and emergency services with NPN", R3-194411, 3GPP TSG-RAN3 Meeting #105, Ljubljana, Slovenia, Aug. 26-30, 2019.

Sony, "Cell selection/reselection with NPN cells", R2-1913363, 3GPP TSG RAN WG2 Meeting# 107bis, Chongqing, China, Oct. 14-18, 2019.

3rd Generation Partnership Project; Technical Specification Group Radio Access Network; NR; Radio Resource Control (RRC) protocol specification, 3GPP TS 38.331 version 15.7.0 Release 15, Sep. 2019.

3rd Generation Partnership Project; Technical Specification Group Radio Access Network; NR; User Equipment (UE) procedures in Idle mode and RRC Inactive state, 3GPP TS 38.304 version 15.5.0 Release 15, Sep. 2019.

3GPP TS 24.501 V16.2.0 (Sep. 2019).

\* cited by examiner

METHOD AND APPARATUS FOR CELL RESERVATION AND ACCESS RESTRICTION

CROSS-REFERENCE TO RELATED APPLICATION(S)

The present disclosure claims the benefit of and priority of provisional U.S. Patent Application Ser. No. 62/927,479, filed on Oct. 29, 2019, entitled "Method and Apparatus for Cell Reservations and Access Restrictions in Non-Public Network(s)" ("the '479 provisional"). The disclosure of the '479 provisional is hereby incorporated fully by reference into the present disclosure for all purposes.

FIELD

The present disclosure is related to wireless communication, and specifically, to a method for cell reservation and access restriction in cellular wireless communication networks.

BACKGROUND

Various efforts have been made to improve different aspects of wireless communication for cellular wireless communication systems, such as fifth generation (5G) New Radio (NR) by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there exists a need for further improvements in the art.

SUMMARY

The present disclosure is related to a method for cell reservation and access restriction in a cellular wireless communication network.

According to an aspect of the present disclosure, a UE is provided that includes one or more non-transitory computer-readable media containing computer-executable instructions embodied therein and at least one processor coupled to the one or more non-transitory computer-readable media. The at least one processor is configured to execute the computer-executable instructions to: receive a master information block (MIB) from a cell, the MIB including a cell barred information element (IE); receive a system information block type 1 (SIB1) from the cell, the SIB1 including a first non-public network (NPN) identity (ID), a first cell reserved for operator use IE associated with the first NPN ID, and a cell reserved for other use IE; and determine whether to treat the cell as a barred cell or a candidate cell for cell selection or cell reselection procedures based on the cell barred IE, the first cell reserved for operator use IE, and the cell reserved for other use IE, wherein the UE treats the cell as the candidate cell for cell selection or cell reselection procedures when the cell barred IE is "not barred", the cell reserved for other use IE is not "true", the first cell reserved for operator use IE is "reserved", the first NPN ID matches a registered stand-alone NPN (SNPN) ID of the UE, and an access ID of the UE is 11 or 15.

According to another aspect of the present disclosure, a method for wireless communication performed by a UE is provided. The method includes: receiving a MIB from a cell, the MIB including a cell barred IE; receiving a SIB1 from the cell, the SIB1 including a first NPN ID, a first cell reserved for operator use IE associated with the first NPN ID, and a cell reserved for other use IE; and determining whether to treat the cell as a barred cell or a candidate cell for cell selection or cell reselection procedures based on the cell barred IE, the first cell reserved for operator use IE, and the cell reserved for other use IE, wherein the UE treats the cell as the candidate cell for cell selection or cell reselection procedures when the cell barred IE is "not barred", the cell reserved for other use IE is not "true", the first cell reserved for operator use IE is "reserved", the first NPN ID matches a registered SNPN ID of the UE, and an access ID of the UE is 11 or 15.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
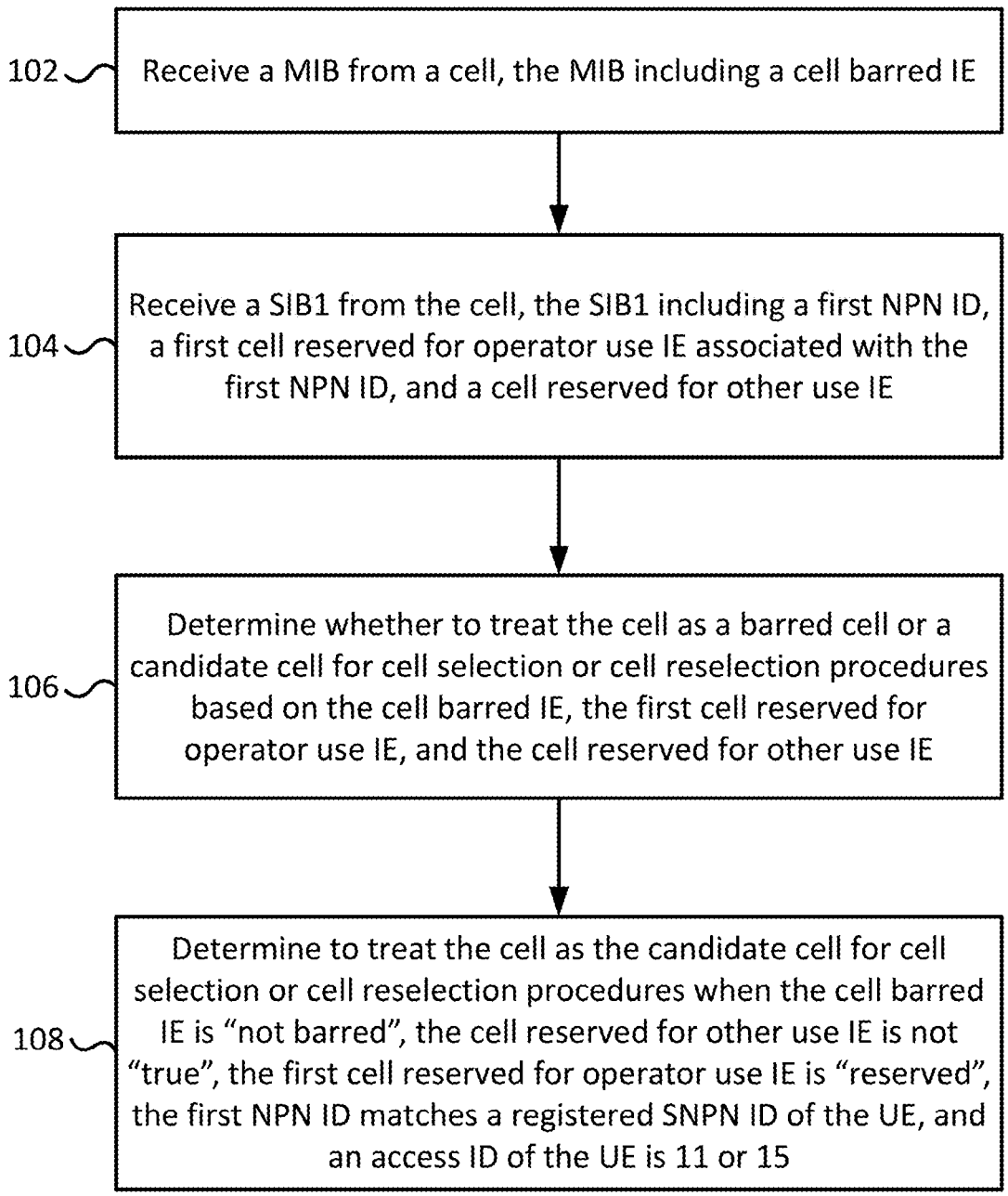
FIG. 1 is a flowchart illustrating a method performed by a UE for cell reservation and access restriction according to an example implementation of the present disclosure.

In order to fulfill the low-latency and high-reliability requirements for the vertical industry and support 5G Local Area Network (LAN)-type service, a dedicated wireless network (e.g., a private network) attracts attention to be included in the next-generation cellular network.

The private network (e.g., NPN) may support vertical and LAN services. The private network may be classified into a stand-alone non-public network (SNPN) and a public network integrated non-public network (PNI-NPN). Operators may focus on the PNI-NPN solutions applicable for a much wide range of use cases such as Small Office Home Office (SOHO) and residential, private network coverage deployments and so on.

The 5G system may be enhanced to support the NPN. Two network identities (ID) are introduced for NPN: Network ID (NID) and Closed Access Group (CAG) ID. 5G Radio Access Network (RAN) may also implement the NPN by enhancing features such as non-public network identification, discovery, selection/reselection, access control and mobility restrictions.

For RAN sharing, the network deployments may vary. A cell may be operated by public network(s) (e.g., Public Land Mobile Network(s) (PLMN) owned by traditional operators) and private network(s) (e.g., SNPN(s) and PNI-NPN(s) owned by operators or enterprises). A UE may be a legacy one that does not support NPN features, an advanced one that supports the NPN features, or an advanced one that does not support the NPN features. Therefore, mechanisms for cell reservations and access restrictions performed by the UE are disclosed to consider a correct cell as a candidate cell for a cell (re)selection procedure.

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Applications Specific Integrated Circuitry (ASIC), programmable logic arrays, and/or using one or more Digital Signal Processors (DSPs). Although some of the disclosed implementations are oriented to software installed and executing on computer hardware, alternative implementations implemented as firmware or as hardware or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR RAN may typically include at least one base station (BS), at least one UE, and one or more optional network elements that provide connection within a network. The UE may communicate with the network such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may be operable to provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, and/or LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising of the SpCell and optionally one or more Secondary Cells (SCells). An SCG may refer to a group of serving cells associated with the Secondary Node (SN), comprising of the SpCell and optionally one or more SCells.

As disclosed previously, the frame structure for NR supports flexible configurations for accommodating various next-generation (e.g., 5G) communication requirements such as eMBB, mMTC, and URLLC, while fulfilling high reliability, high data rate and low latency requirements. The Orthogonal Frequency-Division Multiplexing (OFDM) technology in the $3^{rd}$ Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and an UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Multiple PLMNs may operate on the unlicensed spectrum. Multiple PLMNs may share the same unlicensed carrier. The PLMNs may be public or private. Public PLMNs may be (but not limited to) the operators or virtual operators, which provide radio services to the public subscribers. Public PLMNs may own the licensed spectrum and support the radio access technology on the licensed spectrum as well. Private PLMNs may be (but not limited to) the micro-operators, factories, or enterprises, which provide radio services to their private users (e.g., employees or machines). In some implementations, public PLMNs may support more deployment scenarios (e.g., carrier aggregation (CA) between licensed band NR (PCell) and NR Unlicensed (NR-U) (SCell), dual connectivity (DC) between licensed band LTE (PCell) and NR-U (PSCell), stand-alone NR-U, an NR cell with DL in an unlicensed band and UL in a licensed band, DC between a licensed band NR (PCell) and NR-U (PSCell)). In some implementations, private PLMNs mainly support (but not limited to) the stand-alone unlicensed radio access technology (e.g., stand-alone NR-U).

NPN Scenarios

The NPN scenario may be an SNPN, which may be operated by an NPN operator and not relying on network functions provided by a PLMN. The NPN scenario may be a PNI-NPN, which may be an NPN deployed with the support of a PLMN. The SNPN(s) may be identified by an SNPN ID, where an SNPN ID may include a PLMN ID and/or a Network ID (NID), broadcast in SIB1 of a cell supporting SNPN. The PNI-NPN may be identified by a PNI-NPN ID, where a PNI-NPN ID may include a PLMN ID and/or a Closed Access Group (CAG) ID, broadcast in SIB1 of a cell supporting PNI-NPN features. An NPN ID may be an SNPN ID or a PNI-NPN ID. In one implementation, the cell may broadcast the PLMN ID(s) and/or NID(s) in a first list in a first IE, broadcast the PLMN ID(s) in a second list in a second IE, and broadcast the PLMN ID(s) and/or CAG ID(s) in a third list in a third IE, where the first IE, the second IE, and the third IE may be in SIB1. In one implementation, the cell may broadcast the PLMN ID(s), PLMN ID(s) and/or NID(s), and PLMN ID(s) and/or CAG ID(s), in a first list in a first IE, in SIB1. In one implementation, the cell may broadcast the PLMN ID(s) in a first list in a first IE, and broadcast the PLMN ID(s) and/or NID(s) and the PLMN ID(s) and/or CAG ID(s) in a second list in a second IE, where the first IE and the second IE may be in SIB1.

Considering RAN sharing may be supported in the next-generation cellular network, RAN sharing between PLMN and NPN may include the following "cell type" variants:

Case 1-1: A cell may be shared (operated) by multiple PLMNs. The maximum number of PLMNs sharing the cell may be (but not limited to) 12.

Case 1-2: A cell may be shared (operated) by multiple SNPNs. In one implementation, these SNPNs may share the common PLMN ID but be identified by different NIDs. In one implementation, these SNPNs may be identified by different PLMN IDs and by the same (or different) NID(s). In one implementation, these SNPNs may be identified by different NIDs, but no PLMN ID is used for identification. In one implementation, these SNPNs may be identified by different PLMN IDs, and no NID is used for identification. The maximum number of SNPNs sharing the cell may be (but not limited to) 12. In one implementation, the combination of a PLMN ID and/or a NID may uniquely identify an SNPN.

In one implementation, the cell supporting NPN features (or SNPN-only) may not broadcast NID(s). The cell supporting NPN features (or SNPN-only) may broadcast an NPN-support (or SNPN-only-support) indicator to indicate that the cell supports NPN functions (or SNPN-only functions). The NPN functions (or SNPN-only functions) may apply for PLMN(s) identified by PLMN ID(s) broadcast by the cell. The UE with a registered PLMN ID and/or NID (or with PLMN ID and/or CAG ID) may treat the cell with the NPN-support indicator (or SNPN-only-support indicator) as a candidate cell for cell (re)selection. The UE with a registered PLMN ID and/or NID (or with PLMN ID and/or CAG ID) may treat the cell that broadcasts the NPN-support indicator (or SNPN-only-support indicator) and a PLMN ID that matches the registered PLMN ID of the UE as a candidate cell for cell (re)selection. In one implementation, the UE with a registered PLMN ID and/or a registered NID may treat the cell that broadcasts the NPN-support indicator (or SNPN-only-support indicator) and a PLMN ID and/or a NID that matches the registered PLMN ID and/or the registered NID of the UE as a candidate cell for cell (re)selection. In one implementation, the UE with a registered PLMN ID and/or a registered CAG ID may treat the cell that broadcasts the NPN-support indicator (or SNPN-only-support indicator) and a PLMN ID and/or a CAG ID that matches the registered PLMN ID and/or the registered CAG ID of the UE as a candidate cell for cell (re)selection. A registered SNPN ID may refer to a registered PLMN ID and/or a registered NID. A registered PNI-NPN ID may refer to a registered PLMN ID and/or a registered CAG ID.

Case 1-3: A cell may be shared (operated) by multiple PNI-NPNs. In one implementation, these PNI-NPNs may share the common PLMN ID but be identified by different CAG IDs. In one implementation, these PNI-NPNs may be identified by different PLMN IDs and by the same (or different) CAG ID(s). In one implementation, these PNI-NPNs may be identified by different CAG IDs, but no PLMN ID is used for identification. In one implementation, these PNI-NPNs may be identified by different PLMN IDs, but no CAG ID is used for identification. The maximum number of PNI-NPNs sharing the cell may be (but not limited to) 12. In one implementation, the combination of a PLMN ID and/or a CAG ID may uniquely identify a PNI-NPN.

In one implementation, the cell supporting NPN features (or CAG-only) may not broadcast CAG ID(s). The cell supporting NPN features (or CAG-only) may broadcast an NPN-support (or CAG-only-support) indicator to indicate that the cell supports NPN functions (or CAG-only functions). The NPN functions (or CAG-only functions) may apply for PLMN(s) identified by PLMN ID(s) broadcast by the cell. The UE with a registered PLMN ID and/or CAG ID (or with PLMN ID and/or NID) may treat the cell with the NPN-support indicator (or CAG-only-support indicator) as a candidate cell for cell (re)selection. The UE with a registered PLMN ID and/or CAG ID (or with PLMN ID and/or NID) may treat the cell that broadcasts the NPN-support indicator (or CAG-only-support indicator) and a PLMN ID that matches the registered PLMN ID of the UE as a candidate cell for cell (re)selection. In one implementation, the UE with a registered PLMN ID and/or a registered NID may treat the cell that broadcasts the NPN-support indicator (or CAG-only-support indicator) and a PLMN ID and/or a NID that matches the registered PLMN ID and/or the registered NID of the UE as a candidate cell for cell (re)selection. In one implementation, the UE with a registered PLMN ID and/or a registered CAG ID may treat the cell that broadcasts the NPN-support indicator (or CAG-only-support indicator) and a PLMN ID and/or a CAG ID that matches the registered PLMN ID and/or the registered CAG ID of the UE as a candidate cell for cell (re)selection.

Case 1-4: A cell may be shared (operated) by at least one PLMN and at least one SNPN. The maximum number of PLMNs and SNPNs sharing the cell may be (but not limited to) 12.

Case 1-5: A cell may be shared (operated) by at least one PLMN and at least one PNI-NPN. The maximum number of PLMNs and PNI-NPNs sharing the cell may be (but not limited to) 12.

Case 1-6: A cell may be shared (operated) by at least one PLMN and at least one SNPN and at least one PNI-NPN. The maximum number of PLMNs, SNPNs and PNI-NPNs sharing the cell may be (but not limited to) 12.

Even though RAN sharing is not supported, different network types may include the following "cell type" variants:

Case 1-7: A cell may be operated by PLMN(s) only.
Case 1-8: A cell may be operated by SNPN(s) only.
Case 1-9: A cell may be operated by PNI-NPN(s) only.

In one implementation, a cell supporting (at least) SNPN may be a cell operated by SNPN(s) only, a cell shared by at least one PLMN and at least one SNPN, a cell shared by at least one PLMN and at least one SNPN and at least one PNI-NPN, or a cell shared by at least one SNPN and at least one PNI-NPN. In one implementation, a cell supporting (at least) PNI-NPN may be a cell operated by PNI-NPN(s) only, a cell shared by at least one PLMN and at least one PNI-NPN, a cell shared by at least one PLMN and at least one SNPN and at least one PNI-NPN, or a cell shared by at least one SNPN and at least one PNI-NPN. In one implementation, a cell supporting (at least) PLMN may be a cell operated by PLMN(s) only, a cell shared by at least one PLMN and at least one PNI-NPN, a cell shared by at least one PLMN and at least one SNPN and at least one PNI-NPN, or a cell shared by at least one SNPN and at least one PLMN.

From the UE's perspective, with the advent of NPN network(s), "UE type" may include the following variants:

Case 2-1: A UE may only support the legacy network (without NPN features) (e.g., a 3GPP Rel-15 UE supports Rel-15 features). Rel-15 features may not include NPN network(s). Such UE may not have SNPN functionality. The UE may not have CAG functionality.

Case 2-2: A UE may support only PLMN features in a network supporting NPN features or in a network supporting both NPN features and PLMN features. For example, a 3GPP Rel-16 UE may not support NPN features even if 3GPP Rel-16 supports NPN features. The UE may camp and/or access a cell supporting at least PLMN. The UE may not have SNPN functionality. The UE may not have CAG functionality.

Case 2-3: A UE may support the SNPN network only. For example, the UE may support SNPN access mode only. The UE may camp and/or access a cell supporting at least SNPN. The UE may support SNPN functionality.

Case 2-4: A UE may support the PNI-NPN network only. For example, the UE may support PNI-NPN access mode only. The UE may camp and/or access a cell supporting at least PNI-NPN. The UE may support CAG functionality.

Case 2-5: A UE may support both the PLMN network and the SNPN network. For example, the UE may support PLMN network access mode and SNPN access mode. The UE may camp and/or access a cell supporting at least SNPN or a cell supporting at least PLMN. The UE may support SNPN functionality.

Case 2-6: A UE may support both the PLMN network and the PNI-NPN network. For example, the UE may support PLMN network access mode and PNI-NPN access mode. The UE may camp and/or access a cell supporting at least PLMN or a cell supporting at least PNI-NPN. The UE may support CAG functionality.

Case 2-7: A UE may support both the SNPN network and the PNI-NPN network. For example, the UE may support SNPN access mode and PNI-NPN access mode. The UE may camp and/or access a cell supporting at least SNPN or a cell supporting at least PNI-NPN. The UE may support SNPN functionality. The UE may support CAG functionality.

Case 2-8: A UE may support the PLMN network, the SNPN network and the PNI-NPN network. For example, the UE may support PLMN access mode, SNPN access mode and PNI-NPN access mode. The UE may camp and/or access a cell supporting at least PLMN, a cell supporting at least SNPN, or a cell supporting at least PNI-NPN. The UE may support SNPN functionality. The UE may support CAG functionality.

In one implementation, a UE supporting (at least) SNPN features (or a UE with a registered (or selected) SNPN) may be a UE supporting the SNPN features only, a UE supporting both the SNPN features and the PNI-NPN features, a UE supporting both the SNPN features and the PLMN features, or a UE supporting the PLMN features, the SNPN features and the PNI-NPN features. A UE supporting (at least) SNPN features may operate in a cell supporting (at least) SNPN features. A UE supporting (at least) PNI-NPN features may operate in a cell supporting (at least) PNI-NPN features. A UE supporting (at least) PLMN features may operate in a cell supporting (at least) PLMN features. A UE with a registered SNPN may mean that the UE has a registered SNPN ID (stored in the Non-Access Stratum (NAS) of the UE) and/or the UE has registered the registered SNPN ID with the network. A UE with a selected SNPN may mean that a UE has selected an SNPN (e.g., by the NAS of the UE) identified by a selected SNPN ID and/or the UE has stored the selected SNPN ID in the NAS of the UE. In one implementation, a UE supporting (at least) PNI-NPN features (or a UE with a registered (or selected) PNI-NPN) may be a UE supporting the PNI-NPN features only, a UE supporting both the SNPN features and the PNI-NPN features, a UE supporting both the PNI-NPN features and the PLMN features, or a UE supporting the PLMN features, the SNPN features and the PNI-NPN features. A UE with a registered PNI-NPN may mean that the UE has a registered PNI-NPN ID (stored in the NAS of the UE) and/or the UE has registered the registered PNI-NPN ID with the network. A UE with a selected PNI-NPN may mean that a UE has selected a PNI-NPN (e.g., by the NAS of the UE) identified by a selected PNI-NPN ID and/or the UE has stored the selected PNI-NPN ID in the NAS of the UE. In one implementation, a UE supporting (at least) PLMN features (or a UE with a registered (or selected) PLMN) may be a UE supporting the legacy network (e.g., a network without NPN features), a UE supporting only PLMN features in a network supporting NPN features, a UE supporting both the PLMN features and the SNPN features, a UE supporting both the PLMN features and the PNI-NPN features, or a UE supporting the PLMN features, the SNPN features and the PNI-NPN features. A UE with a registered PLMN may mean that the UE has a registered PLMN ID (stored in the NAS of the UE) and/or the UE has registered the registered PLMN ID with the network. A UE with a selected PLMN may mean that the UE has selected a PLMN (e.g., by the NAS of the UE) identified by a selected PLMN ID and/or the UE has stored the selected PLMN ID in the NAS of the UE.

Cell Barred Information

In one implementation, a cell may broadcast cell barred information, which may be a cell barred IE in a MIB message. In one implementation, the cell barred IE may be in an ENUMERATED {"barred", "not barred"} format.

In one implementation, the value "barred" may mean that the cell is barred for all PLMN(s) supported by the cell for the UE without NPN features. In one implementation, the value "barred" may mean that the cell is barred for all NPN(s) supported by the cell for the UE with NPN features. In one implementation, the value "barred" may mean that the cell is barred for all PLMN(s) supported by the cell for the UE with NPN features.

In one implementation, the value "barred" may mean that the cell is barred for all PLMN(s) supported by the cell for the UE with/without NPN features. In one implementation, the value "barred" may not mean that the cell is barred for all NPN(s) supported by the cell for the UE with NPN features. In one implementation, the UE with a registered (or selected) SNPN/PNI-NPN may ignore the cell barred information.

In one implementation, the value "barred" may mean that the cell is barred for all PLMN(s) supported by the cell for the UE with/without NPN features. In one implementation, the value "barred" may not mean that the cell is barred for all NPN(s) supported by the cell for the UE with NPN features. In one implementation, the UE with a registered (or selected) SNPN/PNI-NPN may read the SIB1 to further check whether the UE is barred from the cell. For example, the UE may jointly consider the cell barred information and PLMN IDs and/or CAG IDs broadcast by the cell to determine whether the UE is barred from the cell. For example, the UE may jointly consider the cell barred information and PLMN IDs and/or NIDs broadcast by the cell to determine whether the UE is barred from the cell.

In one implementation, when a UE bars itself from a cell, the UE may not treat the cell as a candidate cell during a cell (re)selection procedure, and the UE may neither (re)select nor camp on the cell. When the UE does not bar itself from the cell, the UE may treat the cell as a candidate cell during a cell (re)selection procedure, and the UE may (re)select or camp on the cell.

In one implementation, when the UE ignores the cell barred information (or the cell reserved for other use IE, or the cell reserved for operator use IE), the UE may bar itself from the cell, (re)select the cell or camp on the cell regardless of the cell barred information (or the cell reserved for other use IE, or the cell reserved for operator use IE). In one implementation, when the UE ignores the cell barred information (or the cell reserved for other use IE, or the cell reserved for operator use IE), the UE may not act based on the cell barred information (or the cell reserved for other use IE, or the cell reserved for operator use IE).

Case 3-1: A Cell Supporting (At Least) PLMN Broadcasts Cell Barred Information

In one implementation, if a cell supports (at least) PLMN features, the cell barred information may be common for all PLMNs, SNPNs and/or PNI-NPNs operating the cell. The cell may broadcast the PLMN ID(s) identifying the supported PLMN(s), PLMN ID(s) and/or NID(s) identifying the supported SNPN(s), and/or PLMN ID(s) and/or CAG ID(s) identifying the supported PNI-NPN(s), in the system information (e.g., SIB1, other SI).

In some implementations, if the cell barred information (e.g., in MIB) broadcast by a cell is "barred," a UE supporting SNPN features (or a UE with a registered (or selected) SNPN) may receive the SIB1. For example, the UE supporting SNPN features (or the UE with a registered (or selected) SNPN) may need the PLMN information and/or NID(s) broadcast by the cell in SIB1 to determine whether the SNPN feature in the cell is barred, or to determine whether the cell is barred to the UE.

In some implementations, if the cell barred information (e.g., in MIB) broadcast by a cell is "barred," a UE supporting PNI-NPN (or a UE with a registered (or selected) PNI-NPN) may receive the SIB1. For example, the UE supporting PNI-NPN (or the UE with a registered (or selected) PNI-NPN) may need the PLMN information and/or CAG ID(s) broadcast by the cell in SIB1 to determine whether the PNI-NPN feature in the cell is barred, or to determine whether the cell is barred to the UE.

In some implementations, if the cell barred information (e.g., in MIB) broadcast by a cell is "barred," a UE not supporting SNPN features and/or not supporting PNI-NPN features may exclude the cell from being a candidate cell for cell selection/reselection without receiving the SIB1.

In one implementation, if the cell barred information (e.g., in MIB) broadcast by a cell is "barred," a UE with a registered (or selected) specific ID that matches the corresponding specific ID indicated in the system information (e.g., SIB1, other SI) may bar itself from the cell. The UE may neither (re)select nor camp on the cell. On the other hand, a UE with the registered (or selected) specific ID that does not match the corresponding specific ID indicated in the system information (e.g., SIB1, other SI) may not bar itself from the cell. The UE may treat the cell as a candidate cell for cell (re)selection. The UE may (re)select or camp on the cell. In another implementation, a UE with the registered (or selected) specific ID that does not match the corresponding specific ID indicated in the system information (e.g., SIB1, other SI) may ignore the cell barred information. The UE may bar itself from the cell, (re)select the cell or camp on the cell regardless of the cell barred information. The term "specific ID" in the present disclosure may include at least one of the PLMN ID, the combination of at least one of PLMN ID and NID, and the combination of at least one of PLMN ID and CAG ID. For example, the specific ID may be one or more PLMN IDs, one or more NIDs, one or more CAG IDs, one or more pairs of a PLMN ID and a NID, one or more pairs of a PLMN ID and a CAG ID, and any combination thereof.

In one implementation, if the cell barred information (e.g., in MIB) broadcast by a cell is "not barred," a UE with a registered (or selected) specific ID that matches the corresponding specific ID indicated in the system information (e.g., SIB1, other SI) may not bar itself from the cell. The UE may treat the cell as a candidate cell for cell (re)selection. The UE may (re)select or camp on the cell. On the other hand, a UE with the registered (or selected) specific ID that does not match the corresponding specific ID indicated in the system information (e.g., SIB1, other SI) may bar itself from the cell. The UE may neither (re)select nor camp on the cell. In another implementation, a UE with the registered (or selected) specific ID that does not match the corresponding specific ID indicated in the system information (e.g., SIB1, other SI) may ignore the cell barred information. The UE may bar itself from the cell, (re)select the cell or camp on the cell regardless of the cell barred information.

In one implementation, if the cell barred information (e.g., in MIB) broadcast by a cell is "barred," a UE only supporting the legacy network (without NPN features) (e.g., a UE that does not support the NPN features, a UE that only supports the legacy features (e.g., before Rel-16) excluding NPN features) may bar itself from the cell. The UE may neither (re)select nor camp on the cell. For other UEs supporting features (e.g., NPN features) in addition to the legacy network, if they determine that their registered (or selected) specific ID(s) matches the corresponding specific ID(s) indicated in the system information, they may bar themselves from the cell. They may not (re)select or camp on the cell. For other UEs supporting features (e.g., NPN features) in addition to the legacy network, if they determine that their registered (or selected) specific ID(s) does not match the corresponding specific ID(s) indicated in the system information, they may not bar themselves from the cell. They may treat the cell as a candidate cell for cell (re)selection. They may (re)select or camp on the cell. For other UEs supporting features (e.g., NPN features) in addition to the legacy network, if they determine that their registered (or selected) specific ID(s) does not match the corresponding specific ID(s) indicated in the system information, they may ignore the cell barred information. They may bar themselves from the cell, (re)select the cell or camp on the cell.

In one implementation, if the cell barred information (e.g., in MIB) broadcast by a cell is "not barred," a UE only supporting the legacy network (without NPN features) (e.g., a UE that does not support the NPN features, a UE that only supports the legacy features (e.g., before Rel-16) excluding NPN features) may not bar itself from the cell. The UE may treat the cell as a candidate cell for cell (re)selection. The UE may (re)select or camp on the cell. For other UEs supporting features (e.g., NPN features) in addition to the legacy network, if they determine that their registered (or selected) specific ID(s) matches the corresponding specific ID(s) indicated in the system information, they may not bar themselves from the cell. The UE may treat the cell as a candidate cell for cell (re)selection. They may (re)select or camp on the cell. For other UEs supporting features (e.g., NPN features) in addition to the legacy network, if they determine that their registered (or selected) specific ID(s) does not match the corresponding specific ID(s) indicated in the system information, they may bar themselves from the cell. They may neither (re)select nor camp on the cell. For other UEs supporting features (e.g., NPN features) in addition to the legacy network, if they determine that their registered (or selected) specific ID(s) does not match the corresponding specific ID(s) indicated in the system information, they may ignore the cell barred information. They may bar themselves from the cell, (re)select the cell or camp on the cell.

In one implementation, if the cell barred information broadcast by a cell is "barred," a UE supporting (at least) PLMN features, a UE supporting (at least) SNPN features, or a UE supporting (at least) PNI-NPN features may bar itself from the cell. The UE may neither (re)select nor camp on the cell.

In one implementation, if the cell barred information broadcast by a cell is "not barred," a UE supporting (at least) PLMN features, a UE supporting (at least) SNPN features, or a UE supporting (at least) PNI-NPN features may not bar itself from the cell. The UE may (re)select or camp on the cell.

In one implementation, if the cell barred information broadcast by a cell is "barred," a UE only supporting the legacy network (e.g., a UE that does not support the NPN features, a UE that only supports the legacy features (e.g., before Rel-16) excluding NPN features) may bar itself from the cell. The UE may neither (re)select nor camp on the cell. For other UEs (e.g., UEs supporting features (e.g., NPN features) in addition to the legacy network), if a UE supports (at least) PLMN, (at least) SNPN, or (at least) PNI-NPN, the UE may bar itself from the cell. The UE may neither (re)select nor camp on the cell. In another implementation, for other UEs (e.g., UEs supporting features (e.g., NPN features) in addition to the legacy network), if a UE supports (at least) PLMN features, (at least) SNPN features, or (at least) PNI-NPN features, the UE may ignore the cell barred information. The UE may bar itself from the cell, (re)select the cell or camp on the cell.

In one implementation, if the cell barred information broadcast by a cell is "not barred," a UE only supporting the legacy network (without NPN features) (e.g., a UE that does not support the NPN features, a UE that only supports the legacy features (e.g., before Rel-16) excluding NPN features) may not bar itself from the cell. The UE may (re)select or camp on the cell. For other UEs (e.g., UEs supporting features (e.g., NPN features) in addition to the legacy network), if a UE supports (at least) PLMN features, (at least) SNPN features, or (at least) PNI-NPN features, the UE may not bar itself from the cell. The UE may (re)select or camp on the cell. In another implementation, for other UEs (e.g., UEs supporting features (e.g., NPN features) in addition to the legacy network), if a UE supports (at least) PLMN features, (at least) SNPN features, or (at least) PNI-NPN features, the UE may ignore the cell barred information. The UE may bar itself from the cell, (re)select the cell or camp on the cell.

In one implementation, if the cell barred information broadcast by a cell is "barred," a UE only supporting the legacy network (without NPN features) (e.g., a UE that does not support the NPN features, a UE that only supports the legacy features (e.g., before Rel-16) excluding NPN features) or a UE with a registered (or selected) PLMN and supporting a network including the NPN feature may bar itself from the cell. The UE may neither (re)select nor camp on the cell. In one implementation, if the cell barred information broadcast by a cell is "barred," a UE with a registered (or selected) SNPN/PNI-NPN or a UE supporting SNPN features and/or PNI-NPN features may bar itself from the cell. The UE may neither (re)select nor camp on the cell. In another implementation, if the cell barred information broadcast by a cell is "barred," a UE with a registered (or selected) SNPN/PNI-NPN or a UE supporting SNPN features and/or PNI-NPN features may ignore the cell barred information. The UE may bar itself from the cell, (re)select the cell or camp on the cell.

In one implementation, if the cell barred information broadcast by a cell is "not barred," a UE only supporting the legacy network (without NPN features) (e.g., a UE that does not support the NPN features, a UE that only supports the legacy features (e.g., before Rel-16) excluding NPN features) or a UE with a registered (or selected) PLMN and supporting a network including the NPN features may not bar itself from the cell. The UE may treat the cell as a candidate cell for cell (re)selection. The UE may (re)select or camp on the cell. In one implementation, if the cell barred information broadcast by a cell is "not barred," a UE with a registered (or selected) SNPN/PNI-NPN or a UE supporting SNPN features and/or PNI-NPN features may not bar itself from the cell. The UE may (re)select or camp on the cell. In another implementation, if the cell barred information broadcast by a cell is "not barred," a UE with a registered (or selected) SNPN/PNI-NPN or a UE supporting SNPN features and/or PNI-NPN features may ignore the cell barred information. The UE may bar itself from the cell, (re)select the cell or camp on the cell.

Case 3-2: a Cell that Supports Only NPN Features Broadcasts Cell Barred Information In one implementation, if a cell supports NPN features only (e.g., a cell operated by SNPN(s) only, a cell operated by PNI-NPN(s) only, a cell shared by SNPN(s) and PNI-NPN(s)), the cell barred information may be common for all SNPNs and/or PNI-NPNs operating the cell. The cell may broadcast the PLMN ID(s) and/or NID(s) identifying the supporting SNPN(s), and/or broadcast PLMN ID(s) and/or CAG ID(s) identifying the supporting PNI-NPN(s), in the system information (e.g., SIB1, other SI).

In one implementation, if the cell barred information broadcast by a cell is "barred," a UE only supporting the legacy network (without NPN features) (e.g., a UE that does not support the NPN features, a UE that only supports the legacy features (e.g., before Rel-16) excluding NPN features) or a UE with a registered (or selected) PLMN and supporting a network including the NPN features may bar itself from the cell. The UE may neither (re)select nor camp on the cell. In one implementation, if the cell barred information broadcast by a cell is "barred," a UE with a registered (or selected) SNPN/PNI-NPN or a UE supporting SNPN features and/or PNI-NPN features may bar itself from the cell. The UE may neither (re)select nor camp on the cell. In another implementation, if the cell barred information broadcast by a cell is "barred," a UE with a registered (or selected) SNPN/PNI-NPN or a UE supporting SNPN features and/or PNI-NPN features may ignore the cell barred information. The UE may bar themselves from the cell, (re)select the cell or camp on the cell. In yet another implementation, for a UE with a registered (or selected) SNPN/PNI-NPN or a UE supporting SNPN features and/or PNI-NPN features, if the cell barred information broadcast by a cell is "barred" and if the registered (or selected) SNPN(s)/PNI-NPN(s) matches the corresponding NPN ID (e.g., PLMN ID(s) and/or NID(s), PLMN ID(s) and/or CAG ID(s)) broadcast by the cell in the system information (e.g., SIB1, other SI), the UE may bar itself from the cell. In yet another implementation, for a UE with a registered (or selected) SNPN/PNI-NPN or a UE supporting SNPN features and/or PNI-NPN features, if the cell barred information broadcast by a cell is "barred" and if the registered (or selected) SNPN(s)/PNI-NPN(s) does not match the corresponding NPN ID (e.g., PLMN ID(s) and/or NID(s), PLMN ID(s) and/or CAG ID(s)) broadcast by the cell in the system information (e.g., SIB1, other SI), the UE may bar itself from the cell. In yet another implementation, for a UE with a registered (or selected) SNPN/PNI-NPN or a UE supporting SNPN features and/or PNI-NPN features, if the cell barred information broadcast by a cell is "barred" and if the registered (or selected) SNPN(s)/PNI-NPN(s) does not match the corresponding NPN ID (e.g., PLMN ID(s) and/or NID(s), PLMN ID(s) and/or CAG ID(s)) broadcast by the cell in the system information (e.g., SIB1, other SI), the UE may ignore the cell barred information. The UE may bar itself from the cell, (re)select the cell or camp on the cell.

In one implementation, if the cell barred information broadcast by a cell is "not barred," a UE only supporting the legacy network (e.g., a UE that does not support the NPN features, a UE that only supports the legacy features (e.g., before Rel-16) excluding NPN features) or a UE with a registered (or selected) PLMN and supporting a network including the NPN features may bar itself from the cell. The UE may neither (re)select nor camp on the cell. In one implementation, if the cell barred information broadcast by a cell is "not barred," a UE with a registered (or selected) SNPN/PNI-NPN or a UE supporting SNPN features and/or PNI-NPN features may not bar itself from the cell. The UE may (re)select or camp on the cell. In another implementation, if the cell barred information broadcast by a cell is "not barred," a UE with a registered (or selected) SNPN/PNI-NPN or a UE supporting SNPN features and/or PNI-NPN features may ignore the cell barred information. The UE may bar itself from the cell, (re)select the cell or camp on the cell. In yet another implementation, for a UE with a registered (or selected) SNPN/PNI-NPN or a UE supporting SNPN features and/or PNI-NPN features, if the cell barred information broadcast by a cell is "not barred" and if the registered (or selected) SNPN(s)/PNI-NPN(s) matches the corresponding NPN ID (e.g., PLMN ID(s) and/or NID(s), PLMN ID(s) and/or CAG ID(s)) broadcast by the cell in the system information (e.g., SIB1, other SI), the UE may not bar itself from the cell. In yet another implementation, for a UE with a registered (or selected) SNPN/PNI-NPN or a UE supporting SNPN features and/or PNI-NPN features, if the cell barred information broadcast by a cell is "not barred" and if the registered (or selected) SNPN(s)/PNI-NPN(s) does not match the corresponding NPN ID (e.g., PLMN ID(s) and/or NID(s), PLMN ID(s) and/or CAG ID(s)) broadcast by the cell in the system information (e.g., SIB1, other SI), the UE may bar itself from the cell. In yet another implementation, for a UE with a registered (or selected) SNPN/PNI-NPN or a UE supporting SNPN features and/or PNI-NPN features, if the cell barred information broadcast by a cell is "not barred" and if the registered (or selected) SNPN(s)/PNI-NPN(s) does not match the corresponding NPN ID (e.g., PLMN ID(s) and/or NID(s), PLMN ID(s) and/or CAG ID(s)) broadcast by the cell in the system information (e.g., SIB1, other SI), the UE may ignore the cell barred information. The UE may bar itself from the cell, (re)select the cell or camp on the cell.

Cell Reserved for Other Use IE

In one implementation, a cell may broadcast the cell reserved for other use information, which may be a cell reserved for other use IE in system information (e.g., in SIB1, other SI). In one implementation, the cell reserved for other use IE may be in an ENUMERATED {"true", "not true"} format. In one implementation, the cell reserved for other use IE may be in an ENUMERATED {"true"} format where the absence of the cell reserved for other use IE may be equivalent to the value "not true."

Case 4-1: One Cell Reserved for Other Use IE Associated with PLMN(s) and NPN(s)

In one implementation, the cell reserved for other use IE may be associated with PLMN ID(s) identifying the PLMN(s) operating the cell, PLMN ID(s) and/or NID(s) identifying the SNPN(s) operating the cell, and PLMN ID(s) and/or CAG ID(s) identifying the PNI-NPN(s) operating the cell. For example, the cell operated (or shared) by (at least one) PLMN(s), (at least one) SNPN(s), and (at least one) PNI-NPN(s) may broadcast the cell reserved for other use IE. For example, the cell operated (or shared) by (at least one) PLMN(s) and (at least one) SNPN(s) may broadcast the cell reserved for other use IE with the empty (or absent) PLMN ID(s) and/or CAG ID(s). For example, the cell operated (or shared) by (at least one) PLMN(s) and (at least one) PNI-NPN(s) may broadcast the cell reserved for other use IE with the empty (or absent) PLMN ID(s) and/or NID(s). For example, the cell operated (or shared) by (at least one) PNI-NPN(s) and (at least one) SNPN(s) may broadcast the cell reserved for other use IE with the empty (or absent) PLMN ID(s). For example, the cell operated (or shared) by (at least one) PLMN(s) may broadcast the cell reserved for other use IE with the empty (or absent) PLMN ID(s) and/or NID(s) and empty (or absent) PLMN ID(s) and/or CAG ID(s). For example, the cell operated (or shared) by (at least one) PNI-NPN(s) may broadcast the cell reserved for other use IE with the empty (or absent) PLMN ID(s) and empty (or absent) PLMN ID(s) and/or NID(s). For example, the cell operated (or shared) by (at least one) SNPN(s) may broadcast the cell reserved for other use IE with the empty (or absent) PLMN ID(s) and empty (or absent) PLMN ID(s) and/or CAG ID(s).

In one implementation, the cell reserved for other use IE and the corresponding PLMN ID(s), PLMN ID(s) and/or NID(s), and/or PLMN ID(s) and/or CAG ID(s), may be included in one IE (e.g., a cell-specific cell access related IE), which may be broadcast by the cell in the system information.

In one implementation, if the cell reserved for other use IE is "true," a UE only supporting the legacy network (without NPN features) (e.g., a UE that does not support the NPN features, a UE that only supports the legacy features (e.g., before Rel-16) excluding NPN features) may bar itself from the cell or ignore the cell reserved for other use IE. A UE with a registered (or selected) PLMN and supporting a network including the NPN features may bar itself from the cell. A UE with a registered (or selected) SNPN/PNI-NPN may bar itself from the cell.

In one implementation, if the cell reserved for other use IE is "not true" or is absent, a UE only supporting the legacy network (without NPN features) (e.g., a UE that does not support the NPN features, a UE that only supports the legacy features (e.g., before Rel-16) excluding NPN features) may not bar itself from the cell or may ignore the cell reserved for other use IE. A UE with a registered (or selected) PLMN and supporting a network including the NPN features may not bar itself from the cell. A UE with a registered (or selected) SNPN/PNI-NPN may not bar itself from the cell.

In one implementation, a cell may broadcast a first cell reserved for other use IE for UEs supporting the legacy network (without NPN features) and a second cell reserved for other use IE for UEs with a registered (or selected) PLMN and supporting a network including the NPN features and for UEs with a registered SNPN/PNI-NPN. The UE only supporting the legacy network (without NPN features) may ignore the second cell reserved for other use IE. If the first cell reserved for other use IE is "true," the UE only supporting the legacy network (without NPN features) may bar itself from the cell. If the first cell reserved for other use IE is "not true" or is absent, the UE only supporting the legacy network (without NPN features) may not bar itself from the cell. The UE only supporting the legacy network (without NPN features) may treat the cell as a candidate cell for cell (re)selection. The UE only supporting the legacy network (without NPN features) may camp on or (re)select the cell. In one implementation, the first cell reserved for other use IE may be associated with only PLMN ID(s) identifying the PLMN(s) operating the cell.

In one implementation, a UE may receive (optionally) a first cell reserved for other use IE and a second cell reserved for other use IE. The first cell reserved for other use IE may be for UEs supporting the legacy network (without NPN features). The second cell reserved for other use IE may be associated with PLMN ID(s), PLMN ID(s) and/or NID(s), and/or PLMN ID(s) and/or CAG ID(s). A UE with a registered (or selected) PLMN ID and supporting the network with NPN features, a UE with a registered (or selected) PLMN ID and/or NID, or a UE with a registered (or selected) PLMN ID and/or CAG ID may ignore the first cell reserved for other use IE if received. The UE with a registered (or selected) PLMN ID and supporting the network with NPN features, the UE with a registered (or selected) PLMN ID and/or NID, and the UE with a registered (or selected) PLMN ID and/or CAG ID may act based on the second cell reserved for other use IE.

Case 4-2: One Cell Reserved for Other Use IE is Associated with PLMN(s) and SNPN(s), While Another Cell Reserved for Other Use IE is Associated with PNI-NPN(s)

In one implementation, one cell reserved for other use IE (which may be referred to as the first cell reserved for other use IE in case 4-2) may be associated with PLMN ID(s) identifying the PLMN(s) operating the cell and PLMN ID(s) and/or NID(s) identifying the SNPN(s) operating the cell. For example, the cell operated (or shared) by (at least one) PLMN(s) and (at least one) SNPN(s) may broadcast the first cell reserved for other use IE. For example, the cell operated (or shared) by (at least one) PLMN(s) may broadcast the first cell reserved for other use IE with empty (or absent) PLMN ID(s) and/or NID(s). For example, the cell operated (or shared) by (at least one) SNPN(s) may broadcast the first cell reserved for other use IE with empty (or absent) PLMN ID(s). For example, the cell operated (or shared) by (at least one) PNI-NPN(s) may not broadcast the first cell reserved for other use IE.

In one implementation, another cell reserved for other use IE (which may be referred to as the second cell reserved for other use IE in case 4-2) may be associated with PLMN ID(s) and/or CAG ID(s) identifying the PNI-NPN(s) operating the cell. For example, the cell operated (or shared) by (at least one) PNI-NPN(s) may broadcast the second cell reserved for other use IE. For example, the cell operated (or shared) by (at least one) SNPN(s) may not broadcast the second cell reserved for other use IE. For example, the cell operated (or shared) by (at least one) PLMN(s) may not broadcast the second cell reserved for other use IE.

In one implementation, the first cell reserved for other use IE and the corresponding PLMN ID(s) and PLMN ID(s) and/or NID(s) may be included in an IE (e.g., a non-PNI-NPN-specific cell access related IE), which may be broadcast by the cell in the system information. In one implementation, the second cell reserved for other use IE and the corresponding PLMN ID(s) and/or CAG ID(s) may be included in another IE (e.g., a PNI-NPN-specific cell access related IE), which may be broadcast by the cell in the system information. In another implementation, the first and second cell reserved for other use IEs may be included in an IE (e.g., a cell-specific cell access related IE), which may be broadcast by the cell in the system information.

In one implementation, if the first cell reserved for other use IE is "true", a UE only supporting the legacy network (without NPN features) (e.g., a UE that does not support the NPN features, a UE that only supports the legacy features (e.g., before Rel-16) excluding NPN features) may bar itself from the cell or may ignore the first cell reserved for other use IE. A UE with a registered (or selected) PLMN and supporting a network including the NPN feature or a UE with a registered (or selected) SNPN, may bar itself from the cell. A UE with a registered (or selected) PNI-NPN may not bar itself from the cell or the UE may ignore the first cell reserved for other use IE.

In one implementation, if the first cell reserved for other use IE is "not true" or absent, a UE only supporting the legacy network (without NPN features) (e.g., a UE that does not support the NPN features, a UE that only supports the legacy features (e.g., before Rel-16) excluding NPN features) may not bar itself from the cell or may ignore the first cell reserved for other use IE. A UE with a registered (or selected) PLMN and supporting a network including the NPN feature or a UE with a registered (or selected) SNPN may not bar itself from the cell. A UE with a registered (or selected) PNI-NPN may bar itself from the cell or ignore the first cell reserved for other use IE. If a UE does not bar the cell, the UE may treat the cell as a candidate cell for cell (re)selection. The UE may (re)select or camp on the cell.

In one implementation, if the second cell reserved for other use IE is "true", a UE only supporting the legacy network (without NPN features) (e.g., a UE that does not support the NPN features, a UE that only supports the legacy features (e.g., before Rel-16) excluding NPN features) may not bar itself from the cell or may ignore the second cell reserved for other use IE. A UE with a registered (or selected) PLMN and supporting a network including the NPN features or a UE with a registered (or selected) SNPN may not bar itself from the cell or ignore the second cell reserved for other use IE. A UE with a registered (or selected) PNI-NPN may bar itself from the cell.

In one implementation, if the second cell reserved for other use IE is "not true" or absent, a UE only supporting the legacy network (without NPN features) (e.g., a UE that does not support the NPN features, a UE that only supports the legacy features (e.g., before Rel-16) excluding NPN features) may bar itself from the cell or may ignore the second cell reserved for other use IE. A UE with a registered (or selected) PLMN and supporting a network including the NPN features or a UE with a registered (or selected) SNPN may bar itself from the cell or ignore the second cell reserved for other use IE. A UE with a registered (or selected) PNI-NPN may not bar itself from the cell.

In one implementation, a cell may broadcast a third cell reserved for other use IE for UEs supporting the legacy network (without NPN features) in addition to the first cell reserved for other use IE (for UEs with a registered (or selected) PLMN and supporting a network including the NPN features and for UEs with a registered SNPN) and the second cell reserved for other use IE (for UEs with a registered PNI-NPN). A UE only supporting the legacy network (without NPN features) may ignore the first cell reserved for other use IE and the second cell reserved for other use IE. If the third cell reserved for other use IE is "true", the UE only supporting the legacy network (without NPN features) may bar itself from the cell. If the third cell reserved for other use IE is "not true" or absent, the UE only supporting the legacy network (without NPN features) may not bar itself from the cell. The UE only supporting the legacy network (without NPN features) may camp on or (re)select the cell. In one implementation, the third cell reserved for other use IE may be associated with only PLMN ID(s) identifying the PLMN(s) operating the cell.

In one implementation, a UE may receive the first cell reserved for other use IE associated with PLMN ID(s) and PLMN ID(s) and/or NID(s), (optionally) the second cell reserved for other use IE associated with PLMN ID(s) and/or CAG ID(s), and (optionally) the third cell reserved for other use IE for UEs supporting the legacy network (without NPN features). A UE with a registered (or selected) PLMN ID and supporting the network with NPN features or a UE with a registered (or selected) PLMN ID and/or NID may ignore the second cell reserved for other use IE if received and the third cell reserved for other use IE if received. The UE with a registered (or selected) PLMN ID and supporting the network with NPN features or the UE with a registered (or selected) PLMN ID and/or NID may act based on the first cell reserved for other use IE.

In one implementation, a UE may receive (optionally) the first cell reserved for other use IE associated with PLMN ID(s) and PLMN ID(s) and/or NID(s), the second cell reserved for other use IE associated with PLMN ID(s) and/or CAG ID(s), and (optionally) the third cell reserved for other use IE for UEs supporting the legacy network (without NPN features). A UE with a registered (or selected) PLMN ID and/or CAG ID may ignore the first cell reserved for other use IE if received and the third cell reserved for other use IE if received. The UE with a registered (or selected) PLMN ID and/or CAG ID may act based on the second cell reserved for other use IE.

Case 4-3: One Cell Reserved for Other Use IE is Associated with PLMN(s) and PNI-NPN(s), While Another Cell Reserved for Other Use IE is Associated with SNPN(s)

In one implementation, one cell reserved for other use IE (which may be referred to as the first cell reserved for other use IE in case 4-3) may be associated with PLMN ID(s)

identifying the PLMN(s) operating the cell, and PLMN ID(s) and/or CAG ID(s) identifying the PNI-NPN(s) operating the cell. For example, the cell operated (or shared) by (at least one) PLMN(s) and (at least one) PNI-NPN(s) may broadcast the first cell reserved for other use IE. For example, the cell operated (or shared) by (at least one) PLMN(s) may broadcast the first cell reserved for other use IE with empty (or absent) PLMN ID(s) and/or CAG ID(s). For example, the cell operated (or shared) by (at least one) PNI-NPN(s) may broadcast the first cell reserved for other use IE with empty (or absent) PLMN ID(s). For example, the cell operated (or shared) by (at least one) SNPN(s) may broadcast the first cell reserved for other use IE with empty (or absent) PLMN ID(s). For example, the cell operated (or shared) by (at least one) SNPN(s) may not broadcast the first cell reserved for other use UE.

In one implementation, another cell reserved for other use IE (which may be referred to as the second cell reserved for other use IE in case 4-3) may be associated with PLMN ID(s) and/or NID(s) identifying the SNPN(s) operating the cell. For example, the cell operated (or shared) by (at least one) SNPN(s) may broadcast the second cell reserved for other use IE. For example, the cell operated (or shared) by (at least one) PNI-NPN(s) may not broadcast the second cell reserved for other use IE. For example, the cell operated (or shared) by (at least one) PLMN(s) may not broadcast the second cell reserved for other use IE.

In one implementation, the first cell reserved for other use IE and the corresponding PLMN ID(s) and PLMN ID(s) and/or CAG ID(s) may be included in an IE (e.g., a non-SNPN-specific cell access related IE), which may be broadcast by the cell in the system information. In one implementation, the second cell reserved for other use IE and the corresponding PLMN ID(s) and/or NID(s) may be included in another IE (e.g., an SNPN-specific cell access related IE), which may be broadcast by the cell in the system information. In another implementation, the first and second cell reserved for other use IEs may be included in an IE (e.g., a cell-specific cell access related IE), which may be broadcast by the cell in the system information.

In one implementation, if the first cell reserved for other use IE is "true", a UE only supporting the legacy network (without NPN features) (e.g., a UE that does not support the NPN features, a UE that only supports the legacy features (e.g., before Rel-16) excluding NPN features) may bar itself from the cell or may ignore the first cell reserved for other use IE. A UE with a registered (or selected) PLMN and supporting a network including the NPN features or a UE with a registered (or selected) PNI-NPN may bar itself from the cell. A UE with a registered (or selected) SNPN may not bar itself from the cell or the UE may ignore the first cell reserved for other use IE.

In one implementation, if the first cell reserved for other use IE is "not true" or absent, a UE only supporting the legacy network (without NPN features) (e.g., a UE that does not support the NPN features, a UE that only supports the legacy features (e.g., before Rel-16) excluding NPN features) may not bar itself from the cell or may ignore the first cell reserved for other use IE. A UE with a registered (or selected) PLMN and supporting a network including the NPN features or a UE with a registered (or selected) PNI-NPN may not bar itself from the cell. A UE with a registered (or selected) SNPN may bar itself from the cell or the UE may ignore the first cell reserved for other use IE.

In one implementation, if the second cell reserved for other use IE is "true", a UE only supporting the legacy network (without NPN features) (e.g., a UE that does not support the NPN features, a UE that only supports the legacy features (e.g., before Rel-16) excluding NPN features) may not bar itself from the cell, or may ignore the second cell reserved for other use IE. A UE with a registered (or selected) PLMN and supporting a network including the NPN features or a UE with a registered (or selected) PNI-NPN may not bar itself from the cell or may ignore the second cell reserved for other use IE. A UE with a registered (or selected) SNPN may bar itself from the cell.

In one implementation, if the second cell reserved for other use IE is "not true" or absent, a UE only supporting the legacy network (without NPN features) (e.g., a UE that does not support the NPN features, a UE that only supports the legacy features (e.g., before Rel-16) excluding NPN features) may bar itself from the cell or may ignore the second cell reserved for other use IE. A UE with a registered (or selected) PLMN and supporting a network including the NPN features or a UE with a registered (or selected) PNI-NPN may bar itself from the cell or may ignore the second cell reserved for other use IE. A UE with a registered (or selected) SNPN may not bar itself from the cell.

In one implementation, a cell may broadcast a third cell reserved for other use IE for UEs supporting the legacy network (without NPN features) in addition to the first cell reserved for other use IE (for UEs with a registered (or selected) PLMN(s) and supporting a network including the NPN features and for UEs with a registered PNI-NPN(s)) and the second cell reserved for other use IE (for UEs with a registered SNPN(s)). A UE only supporting the legacy network (without NPN features) may ignore the first cell reserved for other use IE and the second cell reserved for other use IE. If the third cell reserved for other use IE is "true", the UE only supporting the legacy network (without NPN features) may bar itself from the cell. If the third cell reserved for other use IE is "not true" or absent, the UE only supporting the legacy network (without NPN features) may not bar itself from the cell. The UE only supporting the legacy network (without NPN features) may camp on or (re)select the cell. In one implementation, the third cell reserved for other use IE may be associated with only PLMN ID(s) identifying the PLMN(s) operating the cell.

In one implementation, a UE may receive the first cell reserved for other use IE associated with PLMN ID(s) and PLMN ID(s) and/or CAG ID(s), (optionally) the second cell reserved for other use IE associated with PLMN ID(s) and/or NID(s), and (optionally) the third cell reserved for other use IE that is for UEs supporting the legacy network (without NPN features). A UE with a registered (or selected) PLMN ID and supporting the network with NPN features or a UE with a registered (or selected) PLMN ID and/or CAG ID may ignore the second cell reserved for other use IE if received and the third cell reserved for other use IE if received. The UE with a registered (or selected) PLMN ID and supporting the network with NPN features or the UE with a registered (or selected) PLMN ID and/or CAG ID may act based on the first cell reserved for other use IE.

In one implementation, a UE may receive (optionally) the first cell reserved for other use IE associated with PLMN ID(s) and PLMN ID(s) and/or CAG ID(s), the second cell reserved for other use IE associated with PLMN ID(s) and/or NID(s), and (optionally) the third cell reserved for other use IE for UEs supporting the legacy network (without NPN features). A UE with a registered (or selected) PLMN ID and/or NID may ignore the first cell reserved for other use IE if received and the third cell reserved for other use IE if received. The UE with a registered (or selected) PLMN ID and/or NID may act based on the second cell reserved for other use IE.

Case 4-4: One Cell Reserved for Other Use IE is Associated with NPN(s), While Another Cell Reserved for Other Use IE is Associated with PLMN(s)

In one implementation, one cell reserved for other use IE (which may be referred to as the first cell reserved for other use IE in case 4-4) may be associated with PLMN ID(s) and/or NID(s) identifying the SNPN(s) operating the cell, and PLMN ID(s) and/or CAG ID(s) identifying the PNI-NPN(s) operating the cell. For example, the cell operated (or shared) by (at least one) SNPN(s) and (at least one) PNI-NPN(s) may broadcast the first cell reserved for other use IE. For example, the cell operated (or shared) by (at least one) SNPN(s) may broadcast the first cell reserved for other use IE with empty (or absent) PLMN ID(s) and/or CAG ID(s). For example, the cell operated (or shared) by (at least one) PNI-NPN(s) may broadcast the first cell reserved for other use IE with empty (or absent) PLMN ID(s) and/or NID(s). For example, the cell operated (or shared) by (at least one) PLMN(s) may not broadcast the first cell reserved for other use IE.

In one implementation, another cell reserved for other use IE (which may be referred to as the second cell reserved for other use IE in case 4-4) may be associated with PLMN ID(s) identifying the PLMN(s) operating the cell. For example, the cell operated (or shared) by (at least one) PLMN(s) may broadcast the second cell reserved for other use IE. For example, the cell operated (or shared) by (at least one) SNPN(s) may not broadcast the second cell reserved for other use IE. For example, the cell operated (or shared) by (at least one) PNI-NPN(s) may not broadcast the second cell reserved for other use IE.

In one implementation, the first cell reserved for other use IE and the corresponding PLMN ID(s) and/or NID(s) and the corresponding PLMN ID(s) and/or CAG ID(s) may be included in an IE (e.g., a NPN-specific cell access related IE), which may be broadcast by the cell in the system information. In one implementation, the second cell reserved for other use IE and the corresponding PLMN ID(s) may be included in another IE (e.g., a non-NPN-specific cell access related IE), which may be broadcast by the cell in the system information. In another implementation, the first and second cell reserved for other use IEs may be included in an IE (e.g., cell-specific cell access related IE), which may be broadcast by the cell in the system information.

In one implementation, if the first cell reserved for other use IE is "true", a UE only supporting the legacy network (without NPN features) (e.g., a UE that does not support the NPN features, a UE that only supports the legacy features (e.g., before Rel-16) excluding NPN features) may not bar itself from the cell or may ignore the first cell reserved for other use IE. A UE with a registered (or selected) PLMN and supporting a network including the NPN features may not bar itself from the cell or may ignore the first cell reserved for other use IE. A UE with a registered (or selected) SNPN or a UE with a registered (or selected) PNI-NPN may bar itself from the cell.

In one implementation, if the first cell reserved for other use IE is "not true" or absent, a UE only supporting the legacy network (without NPN features) (e.g., a UE that does not support the NPN features, a UE that only supports the legacy features (e.g., before Rel-16) excluding NPN features) may bar itself from the cell or may ignore the first cell reserved for other use IE. A UE with a registered (or selected) PLMN and supporting a network including the NPN features may bar itself from the cell or may ignore the first cell reserved for other use IE. A UE with a registered (or selected) SNPN or a UE with a registered (or selected) PNI-NPN may not bar itself from the cell.

In one implementation, if the second cell reserved for other use IE is "true", a UE only supporting the legacy network (without NPN features) (e.g., a UE that does not support the NPN features, a UE that only supports the legacy features (e.g., before Rel-16) excluding NPN features) may bar itself from the cell or may ignore the second cell reserved for other use IE. A UE with a registered (or selected) PLMN and supporting a network including the NPN features may bar itself from the cell. A UE with a registered (or selected) SNPN or a UE with a registered (or selected) PNI-NPN may not bar itself from the cell or may ignore the second cell reserved for other use IE.

In one implementation, if the second cell reserved for other use IE is "not true" or absent, a UE only supporting the legacy network (e.g., a UE that does not support the NPN features, a UE that only supports the legacy features (e.g., before Rel-16) excluding NPN features) may not bar itself from the cell or may ignore the second cell reserved for other use IE. A UE with a registered (or selected) PLMN and supporting a network including the NPN feature may not bar itself from the cell. A UE with a registered (or selected) SNPN or a UE with a registered (or selected) PNI-NPN may bar itself from the cell or may ignore the second cell reserved for other use IE.

In one implementation, a cell may broadcast a third cell reserved for other use IE for UEs supporting the legacy network (without NPN features) in addition to the first cell reserved for other use IE (for UEs with a registered SNPN(s) and for UEs with a registered PNI-NPN(s)) and the second cell reserved for other use IE (for UEs with a registered (or selected) PLMN(s) and supporting a network including the NPN feature). A UE only supporting the legacy network (without NPN features) may ignore the first cell reserved for other use IE and the second cell reserved for other use IE. If the third cell reserved for other use IE is "true", the UE only supporting the legacy network (without NPN features) may bar itself from the cell. If the third cell reserved for other use IE is "not true" or absent, the UE only supporting the legacy network (without NPN features) may not bar itself from the cell. The UE only supporting the legacy network (without NPN features) may camp on or (re)select the cell. In one implementation, the third cell reserved for other use IE may be associated with only PLMN ID(s) identifying the PLMN(s) operating the cell.

In one implementation, a UE may receive (optionally) the first cell reserved for other use IE associated with PLMN ID(s) and/or NID(s) and PLMN ID(s) and/or CAG ID(s), the second cell reserved for other use IE associated with PLMN ID(s), and (optionally) the third cell reserved for other use IE that is for UEs supporting the legacy network (without NPN features). A UE with a registered (or selected) PLMN ID and supporting the network with NPN features may ignore the first cell reserved for other use IE if received and the third cell reserved for other use IE if received. The UE with a registered (or selected) PLMN ID and supporting the network with NPN feature may act based on the second cell reserved for other use IE.

In one implementation, a UE may receive the first cell reserved for other use IE associated with PLMN ID(s) and/or NID(s) and PLMN ID(s) and/or CAG ID(s), (optionally) the second cell reserved for other use IE associated with PLMN ID(s), and (optionally) the third cell reserved for other use IE that is for UEs supporting the legacy network (without NPN features). A UE with a registered (or selected) PLMN ID and/or NID or a UE with a registered (or selected) PLMN ID and/or CAG ID may ignore the second cell reserved for other use IE if received and the third cell reserved for other use IE if received. The UE with a registered (or selected) PLMN ID and/or NID or the UE with a registered (or selected) PLMN ID and/or CAG ID may act based on the first cell reserved for other use IE.

Case 4-5: One Cell Reserved for Other Use IE is Associated with SNPN(s), Another Cell Reserved for Other Use IE is Associated with PLMN(s), While Still Another Cell Reserved for Other Use IE is Associated with PNI-NPN(s)

In one implementation, one cell reserved for other use IE (which may be referred to as the first cell reserved for other use IE in case 4-5) may be associated with PLMN ID(s) and/or NID(s) identifying the SNPN(s) operating the cell. For example, the cell operated (or shared) by (at least one) SNPN(s) may broadcast the first cell reserved for other use IE. For example, the cell operated (or shared) by (at least one) PLMN(s) may not broadcast the first cell reserved for other use IE. For example, the cell operated (or shared) by (at least one) PNI-NPN(s) may not broadcast the first cell reserved for other use IE. For example, the cell not operated (or not shared) by SNPN(s) may not broadcast the first cell reserved for other use IE.

In one implementation, another cell reserved for other use IE (which may be referred to as the second cell reserved for other use IE in case 4-5) may be associated with PLMN ID(s) identifying the PLMN(s) operating the cell. For example, the cell operated (or shared) by (at least one) PLMN(s) may broadcast the second cell reserved for other use IE. For example, the cell operated (or shared) by (at least one) SNPN(s) may not broadcast the second cell reserved for other use IE. For example, the cell operated (or shared) by (at least one) PNI-NPN(s) may not broadcast the second cell reserved for other use IE. For example, the cell not operated (or not shared) by PLMN(s) may not broadcast the second cell reserved for other use IE.

In one implementation, still another cell reserved for other use IE (which may be referred to as the third cell reserved for other use IE in case 4-5) may be associated with PLMN ID(s) and/or CAG ID(s) identifying the PNI-NPN(s) operating the cell. For example, the cell operated (or shared) by (at least one) PNI-NPN(s) may broadcast the third cell reserved for other use IE. For example, the cell operated (or shared) by (at least one) PLMN(s) may not broadcast the third cell reserved for other use IE. For example, the cell operated (or shared) by (at least one) SNPN(s) may not broadcast the third cell reserved for other use IE. For example, the cell not operated (or not shared) by PNI-NPN(s) may not broadcast the third cell reserved for other use IE.

In one implementation, the first cell reserved for other use IE and the corresponding PLMN ID(s) and/or NID(s) may be included in an IE (e.g., an SNPN-specific cell access related IE), which may be broadcast by the cell in the system information. In one implementation, the second cell reserved for other use IE and the corresponding PLMN ID(s) may be included in another IE (e.g., a PLMN-specific cell access related IE), which may be broadcast by the cell in the system information. In one implementation, the third cell reserved for other use IE and the corresponding PLMN ID(s) and/or CAG ID(s) may be included in still another IE (e.g., a PNI-NPN-specific cell access related IE), which may be broadcast by the cell in the system information. In another implementation, the first cell reserved for other use IE, the second cell reserved for other use IE, and the third cell reserved for other use IE may be included in an IE (e.g., a cell-specific cell access related IE), which may be broadcast by the cell in the system information.

In one implementation, if the second cell reserved for other use IE associated with PLMN ID(s) is "true", a UE only supporting the legacy network (without NPN features) (e.g., a UE that does not support the NPN features, a UE that only supports the legacy features (e.g., before Rel-16) excluding NPN features) may bar itself from the cell or may ignore the second cell reserved for other use IE. A UE with a registered (or selected) PLMN and supporting a network including the NPN features may bar itself from the cell. A UE with a registered (or selected) SNPN may not bar itself from the cell or may ignore the second cell reserved for other use IE. A UE with a registered (or selected) PNI-NPN may not bar itself from the cell or may ignore the second cell reserved for other use IE.

In one implementation, if the second cell reserved for other use IE associated with PLMN ID(s) is "not true" or absent, a UE only supporting the legacy network (without NPN features) (e.g., a UE that does not support the NPN features, a UE that only supports the legacy features (e.g., before Rel-16) excluding NPN features) may not bar itself from the cell or may ignore the second cell reserved for other use IE. A UE with a registered (or selected) PLMN and supporting a network including the NPN features may not bar itself from the cell. A UE with a registered (or selected) SNPN may bar itself from the cell or may ignore the second cell reserved for other use IE. A UE with a registered (or selected) PNI-NPN may bar itself from the cell or may ignore the second cell reserved for other use IE.

In one implementation, if the first cell reserved for other use IE associated with PLMN ID(s) and/or NID(s) is "true", a UE only supporting the legacy network (without NPN features) (e.g., a UE that does not support the NPN features, a UE that only supports the legacy features (e.g., before Rel-16) excluding NPN features) may not bar itself from the cell or may ignore the first cell reserved for other use IE. A UE with a registered (or selected) PLMN and supporting a network including the NPN features may not bar itself from the cell or may ignore the first cell reserved for other use IE. A UE with a registered (or selected) SNPN may bar itself from the cell. A UE with a registered (or selected) PNI-NPN may not bar itself from the cell or may ignore the first cell reserved for other use IE.

In one implementation, if the first cell reserved for other use IE associated with PLMN ID(s) and/or NID(s) is "not true" or absent, a UE only supporting the legacy network (without NPN features) (e.g., a UE that does not support the NPN features, a UE that only supports the legacy features (e.g., before Rel-16) excluding NPN features) may bar itself from the cell or may ignore the first cell reserved for other use IE. A UE with a registered (or selected) PLMN and supporting a network including the NPN features may bar itself from the cell or may ignore the first cell reserved for other use IE. A UE with a registered (or selected) SNPN may not bar itself from the cell. A UE with a registered (or selected) PNI-NPN may bar itself from the cell or may ignore the first cell reserved for other use IE.

In one implementation, if the third cell reserved for other use IE associated with PLMN ID(s) and/or CAG ID(s) is "true", a UE only supporting the legacy network (without NPN features) (e.g., a UE that does not support the NPN features, a UE that only supports the legacy features (e.g., before Rel-16) excluding NPN features) may not bar itself from the cell or may ignore the third cell reserved for other use IE. A UE with a registered (or selected) PLMN and supporting a network including the NPN features may not bar itself from the cell or may ignore the third cell reserved for other use IE. A UE with a registered (or selected) SNPN may not bar itself from the cell or may ignore the third cell reserved for other use IE. A UE with a registered (or selected) PNI-NPN may bar itself from the cell.

In one implementation, if the third cell reserved for other use IE associated with PLMN ID(s) and/or CAG ID(s) is "not true" or absent, a UE only supporting the legacy network (without NPN features) (e.g., a UE that does not support the NPN features, a UE that only supports the legacy features (e.g., before Rel-16) excluding NPN features) may bar itself from the cell or may ignore the third cell reserved for other use IE. A UE with a registered (or selected) PLMN and supporting a network including the NPN features may bar itself from the cell or may ignore the third cell reserved for other use IE. A UE with a registered (or selected) SNPN may bar itself from the cell or may ignore the third cell reserved for other use IE. A UE with a registered (or selected) PNI-NPN may not bar itself from the cell.

In one implementation, a cell may broadcast a fourth cell reserved for other use IE for UEs supporting the legacy network (without NPN features) in addition to (optionally) the first cell reserved for other use IE (for UEs with a registered SNPN(s)), the second cell reserved for other use IE (for UEs with a registered (or selected) PLMN(s) and supporting a network including the NPN features), and (optionally) the third cell reserved for other use IE (for UEs with a registered PNI-NPN(s)). A UE only supporting the legacy network (without NPN features) may ignore the second cell reserved for other use IE, the first cell reserved for other use IE if received, and the third cell reserved for other use IE if received. If the fourth cell reserved for other use IE is "true", the UE only supporting the legacy network (without NPN features) may bar itself from the cell. If the fourth cell reserved for other use IE is "not true" or absent, the UE only supporting the legacy network (without NPN features) may not bar itself from the cell. The UE only supporting the legacy network (without NPN features) may camp on or (re)select the cell. In one implementation, the fourth cell reserved for other use IE may be associated with only PLMN ID(s) identifying the PLMN(s) operating the cell.

In one implementation, a UE may receive (optionally) the first cell reserved for other use IE associated with PLMN ID(s) and/or NID(s), the second cell reserved for other use IE associated with PLMN ID(s), (optionally) the third cell reserved for other use IE associated with PLMN ID(s) and/or CAG ID(s), and (optionally) the fourth cell reserved for other use IE that is for UEs supporting the legacy network (without NPN features). A UE with a registered (or selected) PLMN ID and supporting the network with NPN features may ignore the first cell reserved for other use IE if received, the third cell reserved for other use IE if received and the fourth cell reserved for other use IE if received. The UE with a registered (or selected) PLMN ID and supporting the network with NPN features may act based on the second cell reserved for other use IE.

In one implementation, a UE may receive the first cell reserved for other use IE associated with PLMN ID(s) and/or NID(s), (optionally) the second cell reserved for other use IE associated with PLMN ID(s), (optionally) the third cell reserved for other use IE associated with PLMN ID(s) and/or CAG ID(s), and (optionally) the fourth cell reserved for other use IE that is for UEs supporting the legacy network (without NPN features). A UE with a registered (or selected) PLMN ID and/or NID may ignore the second cell reserved for other use IE if received, the third cell reserved for other use IE if received and the fourth cell reserved for other use IE if received. The UE with a registered (or selected) PLMN ID and/or NID may act based on the first cell reserved for other use IE.

In one implementation, a UE may receive (optionally) the first cell reserved for other use IE associated with PLMN ID(s) and/or NID(s), (optionally) the second cell reserved for other use IE associated with PLMN ID(s), the third cell reserved for other use IE associated with PLMN ID(s) and/or CAG ID(s), and (optionally) the fourth cell reserved for other use IE that is for UEs supporting the legacy network (without NPN features). A UE with a registered (or selected) PLMN ID and/or CAG ID may ignore the first cell reserved for other use IE if received, the second cell reserved for other use IE if received and the fourth cell reserved for other use IE if received. The UE with a registered (or selected) PLMN ID and/or CAG ID may act based on the third cell reserved for other use IE.

Cell Reserved for Operator Use IE

In one implementation, a cell may broadcast the cell reserved for operator use information, which may be a cell reserved for operator use IE in system information (e.g., in SIB1, other SI). In one implementation, the cell reserved for operator use IE may be in an ENUMERATED {"reserved", "not reserved"} format. In one implementation, the cell reserved for operator use IE may be in an ENUMERATED {"reserved"} format where the absence of the cell reserved for operator use IE may be equivalent to the value "not reserved."

In one implementation, the cell reserved for operator use IE may be indicated/configured per PLMN, per SNPN, and per PNI-NPN (or per CAG). For example, a cell supporting (at least) PLMN features may broadcast the cell reserved for operator use IE per PLMN operating the cell. For example, a cell supporting (at least) SNPN features may broadcast the cell reserved for operator use IE per SNPN operating the cell. For example, a cell supporting (at least) PNI-NPN features may broadcast the cell reserved for operator use IE per PNI-NPN (or per CAG) operating the cell.

Case 5-1: Cell Reserved for Operator Use IE Per SNPN

In one implementation, the cell reserved for operator use IE and the associated SNPN ID (e.g., PLMN ID and/or NID) may be included in a first IE (e.g., SNPN ID related IE), which may be broadcast by the cell in the system information (e.g., SIB1, other SI). In one implementation, a list of the first IEs may be included in a first list information structure, which may be included in a cell access related IE, which may be broadcast by the cell in the system information (e.g., SIB1, other SI).

Case 5-2: Cell Reserved for Operator Use IE Per PNI-NPN

In one implementation, the cell reserved for operator use IE and the associated PNI-NPN ID (e.g., PLMN ID and/or CAG ID) may be included in a second IE (e.g., PNI-NPN ID related IE), which may be broadcast by the cell in the system information (e.g., SIB1, other SI). In one implementation, a list of the second IEs may be included in a second list information structure, which may be included in a cell access related IE, which may be broadcast by the cell in the system information (e.g., SIB1, other SI).

Case 5-3: Cell Reserved for Operator Use IE Per PLMN

In one implementation, the cell reserved for operator use IE and the associated PLMN ID may be included in a third IE (e.g., PLMN ID related IE), which may be broadcast by the cell in the system information (e.g., SIB1, other SI). In one implementation, a list of the third IEs may be included in a third list information structure, which may be included in a cell access related IE, which may be broadcast by the cell in the system information (e.g., SIB1, other SI).

Case 5-4: Mixed in the List Information Structure

In one implementation, the first list information structure may include the list of the second IE and/or the list of the third IEs. In one implementation, the second list information structure may include the list of the first IEs and/or the list of the third IEs. In one implementation, the third list information structure may include the list of the second IEs and/or the list of the first IEs.

Case 6-1: Cell Reserved for Operator Use IE Per SNPN

In one implementation, if the cell reserved for operator use IE associated with an SNPN ID (e.g., PLMN ID and/or NID) is "reserved," a UE with a registered (or selected) SNPN ID that matches the SNPN ID associated with the received cell reserved for operator use IE may bar itself from the cell. Other UEs, such as a UE with a registered (or selected) SNPN ID that does not match the SNPN ID associated with the received cell reserved for operator use IE, a UE with a registered (or selected) PNI-NPN ID (e.g., PLMN ID and/or CAG ID), a UE with a registered (or selected) PLMN ID supporting the network including NPN features, or a UE supporting the legacy network only (without NPN features), may ignore the cell reserved for operator use IE associated with the SNPN ID.

In one implementation, if the cell reserved for operator use IE associated with an SNPN ID (e.g., PLMN ID and/or NID) is "reserved," a UE that is (a) assigned with an access ID that is valid for use in the home country (e.g., the access ID is 12, 13, or 14) or assigned with an access ID that is used when the UE is configured with specific services (e.g., Multimedia Priority Service (MPS), Mission Critical Service (MCS)) (e.g., the access ID 1 or 2) or when the UE is configured with access ID 0 (e.g., the UE is not configured with a specific access ID such as access ID 1 to 15) and (b) with a registered (or selected) SNPN ID that matches the SNPN ID associated with the received cell reserved for operator use IE may bar itself from the cell. On the other hand, a UE (e.g., a UE having an access ID as 11 or 15) that is (a) neither assigned with an access ID that is valid for use in the home country nor assigned with an access ID that is used when the UE is configured with the specific services (e.g., MPS, MCS) and (b) with a registered (or selected) SNPN ID that matches the SNPN ID associated with the received cell reserved for operator use IE may not bar itself from the cell.

It should be noted that the access IDs 11 and 15 may be only valid for use in Home PLMN (HPLMN) or Equivalent Home PLMN (EHPLMN), and access IDs 12, 13 and 14 may be only valid for use in the home country (e.g., in HPLMN and visited PLMNs of home country).

In some implementations, if the cell reserved for operator use IE associated with an SNPN ID (e.g., PLMN ID and/or NID) is "not reserved" or absent, a UE with a registered (or selected) SNPN ID that matches the SNPN ID associated with the received cell reserved for operator use IE may not bar itself from the cell. Other UEs, such as a UE with a registered (or selected) SNPN ID that does not match the SNPN ID associated with the received cell reserved for operator use IE, a UE with a registered (or selected) PNI-NPN ID (e.g., PLMN ID and/or CAG ID), a UE with a registered (or selected) PLMN ID supporting the network including NPN features, a UE supporting the legacy network only (without NPN features), may ignore the cell reserved for operator use IE associated with the SNPN ID.

Case 6-2: Cell Reserved for Operator Use IE Per PNI-NPN or Per CAG

In some implementations, if the cell reserved for operator use IE associated with a PNI-NPN ID (e.g., PLMN ID and/or CAG ID) is "reserved," a UE with a registered (or selected) PNI-NPN ID that matches the PNI-NPN ID associated with the received cell reserved for operator use IE may bar itself from the cell. Other UEs, such as a UE with a registered (or selected) PNI-NPN ID that does not match the PNI-NPN ID associated with the received cell reserved for operator use IE, a UE with a registered (or selected) SNPN ID (e.g., PLMN ID and/or NID), a UE with a registered (or selected) PLMN ID supporting the network including NPN features, or a UE supporting the legacy network only (without NPN features), may ignore the cell reserved for operator use IE associated with the PNI-NPN ID.

In one implementation, if the cell reserved for operator use IE associated with a PNI-NPN ID (e.g., PLMN ID and/or CAG ID) is "reserved," a UE that is (a) assigned with an access ID that is valid for use in the home country (e.g., the access ID is 12, 13, or 14) or assigned with an access ID that is used when the UE is configured with specific services (e.g., MPS, MCS) (e.g., the access ID is 1 or 2) or when the UE is configured with access ID 0 (e.g., the UE is not configured with a specific access ID such as access ID 1 to 15) and (b) with a registered (or selected) PNI-NPN ID that matches the PNI-NPN ID associated with the received cell reserved for operator use IE may bar itself from the cell. On the other hand, a UE (e.g., a UE having an access ID as 11 or 15) that is (a) neither assigned with an access ID that is valid for use in the home country nor assigned with an access ID that is used when the UE is configured with the specific services (e.g., MPS, MCS) and (b) with a registered (or selected) PNI-NPN ID that matches the PNI-NPN ID associated with the received cell reserved for operator use IE may not bar itself from the cell.

In some implementations, if the cell reserved for operator use IE associated with a PNI-NPN ID (e.g., PLMN ID and/or CAG ID) is "not reserved" or absent, a UE with a registered (or selected) PNI-NPN ID that matches the PNI-NPN ID associated with the received cell reserved for operator use IE may not bar itself from the cell. Other UEs, such as a UE with a registered (or selected) PNI-NPN ID that does not match the PNI-NPN ID associated with the received cell reserved for operator use IE, a UE with a registered (or selected) SNPN ID (e.g., PLMN ID and/or NID), a UE with a registered (or selected) PLMN ID supporting the network including NPN features, or a UE supporting the legacy network only (without NPN features), may ignore the cell reserved for operator use IE associated with the PNI-NPN ID.

Case 6-3: Cell Reserved for Operator Use IE Per PLMN

In one implementation, if the cell reserved for operator use IE associated with a PLMN ID is set to be "reserved," a UE with a registered (or selected) PLMN ID that matches the PLMN ID associated with the received cell reserved for operator use IE may bar itself from the cell, where the UE supports the network including NPN features. Other UEs, such as a UE with a registered (or selected) PLMN ID that does not match the PLMN ID associated with the received cell reserved for operator use IE where the UE supports the network including NPN features, a UE with a registered (or selected) SNPN ID (e.g., PLMN ID and/or NID), a UE with a registered (or selected) PNI-NPN ID (e.g., PLMN ID and/or CAG ID), or a UE supporting the legacy network only (without NPN features), may ignore the cell reserved for operator use IE associated with the PLMN ID.

In one implementation, if the cell reserved for operator use IE associated with a PLMN ID is "reserved," a UE that is (a) assigned with an access ID that is valid for use in the home country (e.g., the access ID is 12, 13, or 14) or assigned with an access ID that is used when the UE is configured with specific services (e.g., MPS, MCS) (e.g., the access ID 1 or 2) or when the UE is configured with access ID 0 (e.g., the UE is not configured with a specific access ID such as access ID 1 to 15) and (b) with a registered (or selected) PLMN ID that matches the PLMN ID associated with the received cell reserved for operator use IE may bar itself from the cell. On the other hand, a UE (e.g., a UE having an access ID as 11 or 15) that is (a) neither assigned with an access ID that is valid for use in the home country nor assigned with an access ID that is used when the UE is configured with the specific services (e.g., MPS, MCS) and (b) with a registered (or selected) PLMN ID that matches the PLMN ID associated with the received cell reserved for operator use IE may not bar itself from the cell.

In some implementations, if the cell reserved for operator use IE associated with a PLMN ID is "not reserved" or absent, a UE with a registered (or selected) PLMN ID that matches the PLMN ID associated with the received cell reserved for operator use IE may not bar itself from the cell, where the UE supports the network including NPN features. Other UEs such as a UE with a registered (or selected) PLMN ID that does not match the PLMN ID associated with the received cell reserved for operator use IE where the UE supports the network including NPN features, a UE with a registered (or selected) SNPN ID (e.g., PLMN ID and/or NID), a UE with a registered (or selected) PNI-NPN ID (e.g., PLMN ID and/or CAG ID), or a UE supporting the legacy network only (without NPN features), may ignore the cell reserved for operator use IE associated with the PLMN ID.

UE Behavior by Jointly Considering Multiple IEs

In one implementation, if a UE (e.g., a UE supporting legacy network only (without NPN features), a UE with a registered (or selected) PLMN ID and supporting the network including the NPN features, a UE with a registered (or selected) PLMN ID and/or NID, a UE with a registered (or selected) PLMN ID and/or CAG ID) does not bar itself from a cell based on the received cell barred IE, the cell reserved for other use IE and/or the cell reserved for operator use IE broadcast by the cell, the UE may treat the cell as a candidate cell during the cell (re)selection procedures. The UE may camp on or (re)select the cell.

In one implementation, if a UE (e.g., a UE supporting legacy network only (without NPN features), a UE with a registered (or selected) PLMN ID and supporting the network including the NPN features, a UE with a registered (or selected) PLMN ID and/or NID, a UE with a registered (or selected) PLMN ID and/or CAG ID) bars itself based on the received cell barred IE, the UE may not be permitted to (re)select the cell, not even for limited services and/or emergency calls, regardless of the received cell reserved for operator use IE and the received cell reserved for other use IE. In one implementation, if a UE bars itself based on the received cell barred IE and if the cell supports (at least) PNI-NPN (e.g., a CAG cell) (e.g., the UE receives at least one PLMN ID and/or CAG ID from the cell in the system information), the UE may camp on the cell as an acceptable cell for emergency services (or limited services). In one implementation, if a UE bars itself based on the received cell barred IE and if the cell supports (at least) PNI-NPN (e.g., a CAG cell) (e.g., the UE receives at least one PLMN ID and/or CAG ID from the cell in the system information) and if the cell supports emergency service/calls (or limited service) (e.g., the UE may receive an indicator broadcast by the cell supporting PNI-NPN features, where the indicator may be associated with the PNI-NPN information broadcast by the cell, where the indicator may indicate whether the cell supports emergency service/calls (or limited service)), the UE may camp on the cell as an acceptable cell for emergency services (or limited services).

In one implementation, if a UE (e.g., a UE supporting legacy network only (without NPN features), a UE with a registered (or selected) PLMN ID and supporting the network including the NPN features, a UE with a registered (or selected) PLMN ID and/or NID, a UE with a registered (or selected) PLMN ID and/or CAG ID) bars itself based on the received cell reserved for operator use IE, the UE may not be permitted to (re)select this cell, not even for limited services and/or emergency calls, regardless of the received cell barred IE and the received cell reserved for other use IE. In one implementation, if a UE bars itself based on the received cell reserved for operator use IE and if the cell supports (at least) PNI-NPN (e.g., a CAG cell) (e.g., the UE receives at least one PLMN ID and/or CAG ID from the cell in the system information), the UE may camp on the cell as an acceptable cell for emergency service/calls (or limited services). In one implementation, if a UE bars itself based on the received cell reserved for operator use IE and if the cell supports (at least) PNI-NPN (e.g., a CAG cell) (e.g., the UE receives at least one PLMN ID and/or CAG ID from the cell in the system information) and if the cell supports emergency service/calls (or limited service) (e.g., the UE may receive an indicator broadcast by the cell supporting PNI-NPN features, where the indicator may be associated with the PNI-NPN information broadcast by the cell, where the indicator may indicate whether the cell supports emergency service/calls (or limited service)), the UE may camp on the cell as an acceptable cell for emergency service/calls (or limited service).

In one implementation, if a UE (e.g., a UE supporting legacy network only (without NPN features), a UE with a registered (or selected) PLMN ID and supporting the network including the NPN features, a UE with a registered (or selected) PLMN ID and/or NID, a UE with a registered (or selected) PLMN ID and/or CAG ID) bars itself based on the received cell reserved for other use IE, the UE may not be permitted to (re)select this cell, not even for limited service and/or emergency calls, regardless of the received cell reserved for operator use IE and the received cell barred IE. In one implementation, if a UE bars itself based on the received cell reserved for other use IE and if the cell supports (at least) PNI-NPN features (e.g., a CAG cell) (e.g., the UE receives at least one PLMN ID and/or CAG ID broadcast from the cell in the system information), the UE may camp on the cell as an acceptable cell for emergency service/calls (or limited service). In one implementation, if a UE bars itself based on the received cell reserved for other use IE and if the cell supports (at least) PNI-NPN features (e.g., a CAG cell) (e.g., the UE receives at least one PLMN ID and/or CAG ID broadcast from the cell in the system information) and if the cell supports emergency service/calls (or limited service) (e.g., the UE may receive an indicator broadcast by the cell supporting PNI-NPN features, where the indicator may be associated with the PNI-NPN information broadcast by the cell, where the indicator may indicate whether the cell supports emergency service/calls (or limited service)), the UE may camp on the cell as an acceptable cell for emergency services (or limited service).

Handling of Tracking Area Code (TAC)

In some implementations, a cell may broadcast a specific TAC value associated with a corresponding PLMN ID and/or CAG ID. If a UE (e.g., a UE supporting legacy network only (without NPN features), a UE with a registered (or selected) PLMN ID and supporting the network including the NPN features, a UE with a registered (or selected) PLMN ID and/or NID, a UE with a registered (or selected) PLMN ID and/or CAG ID) receives the PLMN ID and/or CAG ID from the cell with the corresponding TAC field absent, the UE may still apply the limited service with the cell (e.g., a cell supporting only CAG features, a CAG-only cell). Therefore, limited service (e.g., emergency service/calls, Earthquake & Tsunami Warning System (ETWS), Commercial Mobile Alert System (CMAS) notifications, Public Safety (PS) related sidelink communication (Tx/Rx), V2X sidelink communication (Tx/Rx) and PS-related sidelink discovery (Tx/Rx)) may be supported by the cell. The UE may treat the cell as a candidate for an acceptable cell. The UE may camp on or (re)select this cell.

In some implementations, the cell may not broadcast TAC value associated with the corresponding PLMN ID and/or CAG ID. That is, the TAC value corresponding to the PLMN ID and/or CAG ID may be absent. If a UE (e.g., a UE supporting legacy network only (without NPN features), a UE with a registered (or selected) PLMN ID and supporting the network including the NPN features, a UE with a registered (or selected) PLMN ID and/or NID, a UE with a registered (or selected) PLMN ID and/or CAG ID) receives the PLMN ID and/or CAG ID from the cell with the corresponding TAC field absent, the UE may still apply the limited service with the cell (e.g., a cell supporting only CAG features, a CAG-only cell). Therefore, limited service is allowed. The UE may treat the cell as a candidate for an acceptable cell. The UE may camp on or (re)select this cell.

In some implementations, the cell may broadcast a specific TAC value associated with the corresponding PLMN ID and/or NID. If a UE (e.g., a UE supporting legacy network only (without NPN features), a UE with a registered (or selected) PLMN ID and supporting the network including the NPN features, a UE with a registered (or selected) PLMN ID and/or NID, a UE with a registered (or selected) PLMN ID and/or CAG ID) receives the PLMN ID and/or NID from the cell with the corresponding TAC field absent, the UE may bar this cell (e.g., a cell supporting only SNPN features, an SNPN-only cell). The UE may not treat the cell as a candidate cell for a cell (re)selection procedure.

In some implementations, the cell may not broadcast TAC value associated with the corresponding PLMN ID and/or NID. For example, a cell supporting only SNPN features may not broadcast TAC value associated with the corresponding PLMN ID and/or NID.

In some implementations, the fact that the UE may not bar itself from the cell may represent that the UE may treat the cell as a candidate cell for cell (re)selection. The UE may further camp on or (re)select the cell.

Network (NW), cell, camped cell, serving cell, base station, gNB, eNB and ng-eNB may be used interchangeably in the present disclosure. In some implementations, some of these items may refer to the same network entity.

The disclosed mechanism may be applied to any RAT. The RAT may include, but not limited thereto, NR, NR-U, LTE, E-UTRA connected to 5GC, LTE connected to 5GC, E-UTRA connected to EPC, and LTE connected to EPC.

The disclosed mechanism may be used for licensed frequency and/or unlicensed frequency.

System information (SI) may include MIB, SIB1, and other SI. Minimum SI may include MIB and SIB1. Other SI may refer to SIB2, SIB3, SIB4, SIB5, and other SIB(s).

Dedicated signaling may refer to (but not limited to) RRC message(s), such as RRC (Connection) Setup Request message, RRC (Connection) Setup message, RRC (Connection) Setup Complete message, RRC (Connection) Reconfiguration message, RRC Reconfiguration message with the information including reconfiguration with sync configuration, RRC Reconfiguration message without the information of reconfiguration with sync configuration, the information of reconfiguration with sync configuration included in RRC Reconfiguration message, RRC (Connection) Reconfiguration Complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC System Information Request message, UE Assistance Information message, UE Capability Enquiry message, and UE Capability Information message. The UE may monitor the UE-specific Search Space (USS) to derive the time/frequency resources (e.g., Physical Downlink Shared Channel (PDSCH) resources) for the reception of the dedicated signaling.

The RRC_IDLE/RRC_INACTIVE UE may camp on a cell (e.g., camped cell). The RRC_CONNECTED UE may be served by a (serving) cell. Implementations in the present disclosure may be applicable for RRC_IDLE/RRC_INACTIVE/RRC_CONNECTED UE(s).

The UE may be served by a cell, e.g., serving cell. The serving cell may serve (but not limited to) an RRC_CONNECTED UE. The serving cell may be (but not limited to) a suitable cell.

The UE may camp on a cell, e.g., camped cell. The camped cell may be a suitable cell or an acceptable cell.

A suitable cell is a cell on which a UE may camp. The UE (e.g., especially not in an SNPN access mode) may consider a cell as suitable if the following conditions are fulfilled: (1) The cell is part of either the selected PLMN or the registered PLMN or PLMN of the Equivalent PLMN list, and (2) The cell selection criteria (e.g., S criteria) of the cell are fulfilled. Furthermore, according to the latest information provided by the NAS of the UE, the suitable cell is not barred. The suitable cell is part of at least one Tracking Area (TA) that is not part of the list of "Forbidden Tracking Areas", which belongs to a PLMN that fulfills the condition (1).

An acceptable cell is a cell on which the UE may camp to obtain the limited service (originate emergency calls and receive ETWS and CMAS notifications). Such a cell may fulfill the following requirements, which is the minimum set of requirements to initiate an emergency call and to receive ETWS and CMAS notification in an NR network: (1) the cell is not barred, and/or (2) the cell selection criteria are fulfilled.

The limited service may include, but not limited to, originating emergency calls and/or receiving ETWS and CMAS notifications by the UE.

The disclosed mechanism(s) may be applied for UEs to access (but not limited) a PCell.

Primary Cell (PCell): The MCG cell, operating on the primary frequency, in which the UE either performs the initial connection establishment procedure or initiates the connection re-establishment procedure.

Primary SCG Cell (PSCell): For dual connectivity operation, the SCG cell in which the UE performs random access when performing the Reconfiguration with Sync procedure.

Serving Cell: For a UE in the RRC_CONNECTED state not configured with CA/DC there is only one serving cell comprising of the primary cell. For a UE in the RRC_CONNECTED state configured with CA/DC the term "serving cells" is used to denote the set of cells comprising of the Special Cell(s) and all secondary cells.

Secondary Cell (SCell): For a UE configured with CA, a cell providing additional radio resources on top of Special Cell.

Special Cell (SpCell): For Dual Connectivity operation the term Special Cell refers to the PCell of the MCG or the PSCell of the SCG, otherwise the term Special Cell refers to the PCell.

Master Cell Group (MCG): in MR-DC, a group of serving cells associated with the Master Node, comprising of the SpCell (e.g., PCell) and optionally one or more SCells.

Master node: in MR-DC, the radio access node that provides the control plane connection to the core network. It may be a Master eNB (in E-UTRANR-Dual Connectivity (EN-DC)), a Master ng-eNB (in Next Generation E-UTRA NR-Dual Connectivity (NGEN-DC)) or a Master gNB (in NR NR-Dual Connectivity (NR-DC) and NR E-UTRA-Dual Connectivity (NE-DC)).

Secondary Cell Group (SCG): in MR-DC, a group of serving cells associated with the Secondary Node, comprising of the SpCell (e.g., PSCell) and optionally one or more SCells.

Secondary node: in MR-DC, the radio access node, with no control plane connection to the core network, providing additional resources to the UE. It may be a gNB (in EN-DC), a Secondary ng-eNB (in NE-DC) or a Secondary gNB (in NR-DC and NGEN-DC).

FIG. 1 is a flowchart illustrating a method 100 performed by a UE for cell reservation and access restriction according to an example implementation of the present disclosure. In action 102, the UE may receive a MIB from a cell, the MIB including a cell barred IE. In one implementation, the cell barred IE may be in an ENUMERATED {"barred", "not barred"} format. In action 104, the UE may receive a SIB1 from the cell, the SIB1 including a first NPN ID, a first cell reserved for operator use IE associated with the first NPN ID, and a cell reserved for other use IE. In one implementation, the cell reserved for other use IE may be in an ENUMERATED {"true", "not true"} format or an ENUMERATED {"true"} format. In one implementation, the cell reserved for operator use IE may be in an ENUMERATED {"reserved", "not reserved"} format or an ENUMERATED {"reserved"} format.

In one implementation, the first NPN ID may be one of an SNPN ID and a PNI-NPN ID. In one implementation, the SNPN ID may include a PLMN ID and an NID. In one implementation, the PNI-NPN ID may include a PLMN ID and a CAG ID. In one implementation, the SIB1 may include multiple NPN IDs, with each NPN ID associated with a cell reserved for operator use IE. That is, the cell reserved for operator use IE may be indicated per NPN. For example, the SIB1 may further include a second NPN ID and a second cell reserved for operator use IE associated with the second NPN ID. In one implementation, the cell barred IE may be common for all PLMNs/NPNs supported by the cell or indicated in SIB1. For example, the cell barred IE may be common for a first NPN indicated by the first NPN ID and a second NPN indicated by the second NPN ID. In one implementation, the SIB1 may further include a first TAC associated with the first NPN ID. The SIB1 may further include a second TAC associated with the second NPN ID. In one implementation, the SIB1 may further include a list of PLMN IDs. The cell barred IE may be common for all PLMNs indicated by the list of PLMN IDs. In one implementation, the cell reserved for other use IE may also be common for all PLMNs indicated by the list of PLMN IDs.

In action 106, the UE may determine whether to treat the cell as a barred cell or a candidate cell for cell selection or cell reselection procedures based on the cell barred IE, the cell reserved for operator use IE, and the cell reserved for other use IE. In one implementation, the UE may determine the cell as a barred cell in a case that the cell barred IE is "barred." In one implementation, the UE may determine whether to treat the cell as a barred cell or a candidate cell for cell selection or cell reselection procedures further based on an access ID of the UE. The access ID may range from 0 to 15 as specified in the 3GPP TS 24.501 V16.2.0.

In action 108, the UE may determine to treat the cell as a candidate cell for cell selection or cell reselection procedures when the cell barred IE is "not barred", the cell reserved for other use IE is not "true", the cell reserved for operator use IE is "reserved", the first NPN ID matches a registered SNPN ID of the UE, and an access ID of the UE is 11 or 15.

In one implementation, the UE may determine to treat the cell as a barred cell when the cell barred IE is "not barred", the cell reserved for other use IE is not "true", the first cell reserved for operator use IE is "reserved", the first NPN ID matches the registered SNPN ID of the UE, and the access ID of the UE is 0, 1, 2, 12, 13 or 14.

Figure 2:
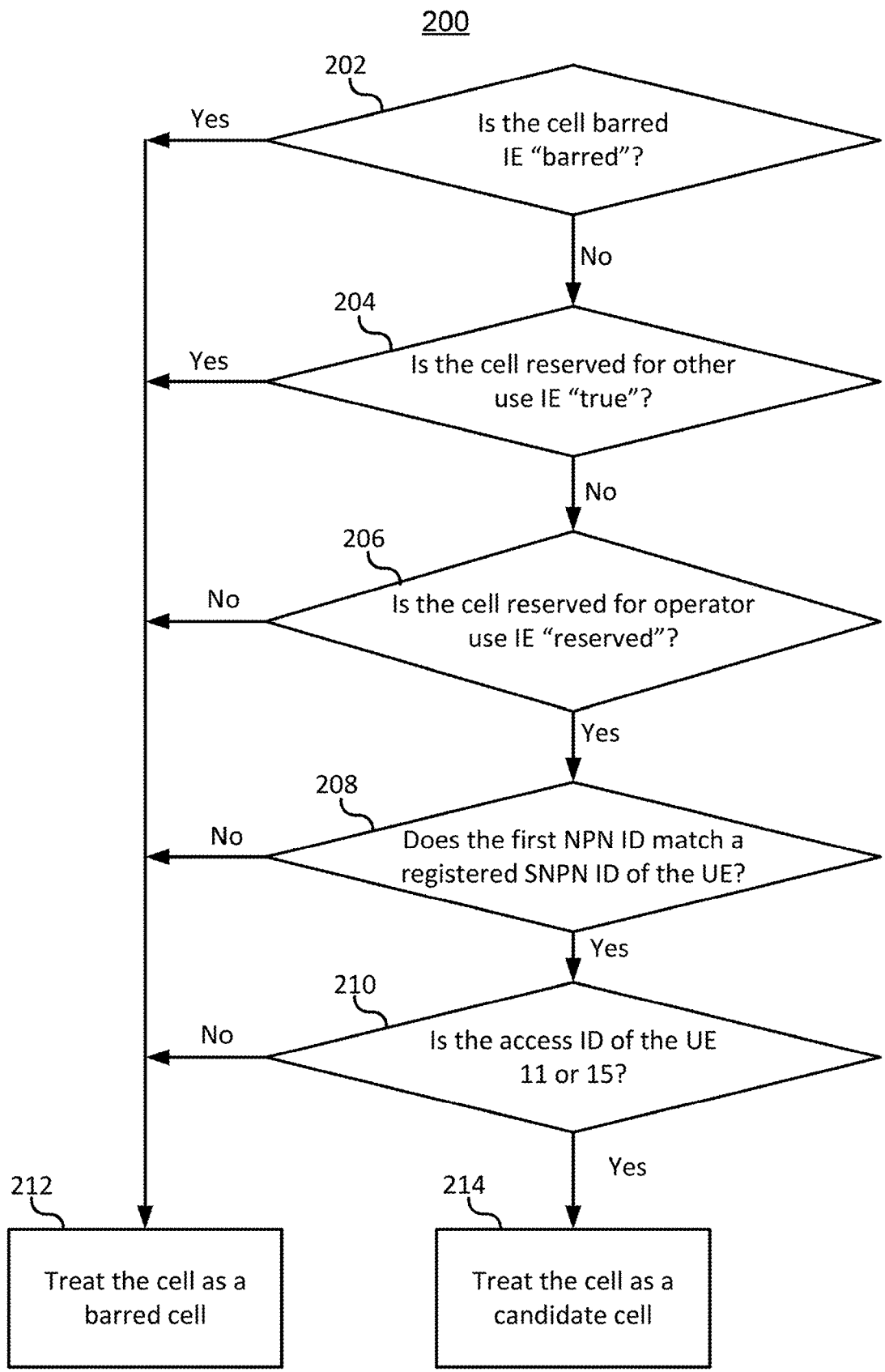
FIG. 2 is a flowchart illustrating a method performed by a UE for determining whether to treat a cell as a candidate cell or a barred cell according to an example implementation of the present disclosure.

FIG. 2 is a flowchart illustrating a method 200 performed by a UE for determining whether to treat a cell as a candidate cell or a barred cell according to an example implementation of the present disclosure. The method 200 may be an implementation of the action 106 illustrated in FIG. 1. In action 202, the UE may check the cell barred IE, which may be broadcast via a MIB from the cell. If the cell barred IE is "barred," the UE may perform action 212 to treat the cell as a barred cell. If the cell barred IE is not "barred," the UE may perform action 204 to check the cell reserved for other use IE. If the cell reserved for other use IE is "true," the UE may perform action 212 to treat the cell as a barred cell. If the cell reserved for other use IE is not "true," the UE may perform action 206 to check the cell reserved for operator use IE.

In action 206, the UE may check the cell reserved for operator use IE that is associated with the registered (or selected) NPN of the UE. For example, the UE may receive a SIB1 that includes a first NPN ID, a first cell reserved for operator use IE associated with the first NPN ID, a second NPN ID, and a second cell reserved for operator use IE associated with the second NPN ID. The UE may check the first cell reserved for operator use IE (and ignore the second cell reserved for operator use IE) if the registered (or selected) NPN of the UE corresponds to the first NPN ID. The UE may check the second cell reserved for operator use IE (and ignore the first cell reserved for operator use IE) if the registered (or selected) NPN of the UE corresponds to the second NPN ID. If the cell reserved for operator use IE in action 206 is not "reserved," the UE may perform action 212 to treat the cell as a barred cell. If the cell reserved for operator use IE in action 206 is "reserved," the UE may perform action 208.

When the first cell reserved for operator use IE is used in action 206, in action 208, the UE may check whether the first NPN ID matches a registered SNPN ID of the UE. If the first NPN ID does not match the registered SNPN ID of the UE, the UE may perform action 212 to treat the cell as a barred cell. If the first NPN ID matches the registered SNPN ID of the UE, the UE may perform action 210 to check the access ID of the UE. If the access ID of the UE is 0, 1, 2, 12, 13, or 14, the UE may perform action 212 to treat the cell as a barred cell. If the access ID of the UE is 11 or 15, the UE may perform action 214 to treat the cell as a candidate cell.

The actions illustrated in FIG. 2 should not be construed as necessarily order dependent. The order in which the process is described is not intended to be construed as a limitation. Actions 202, 204, 206, 208, and 210 may be performed in an order different than that illustrated in FIG. 2. For example, action 206 may be performed before action 204 in one implementation, action 210 may be performed before action 208 in one implementation, and so on.

Figure 3:
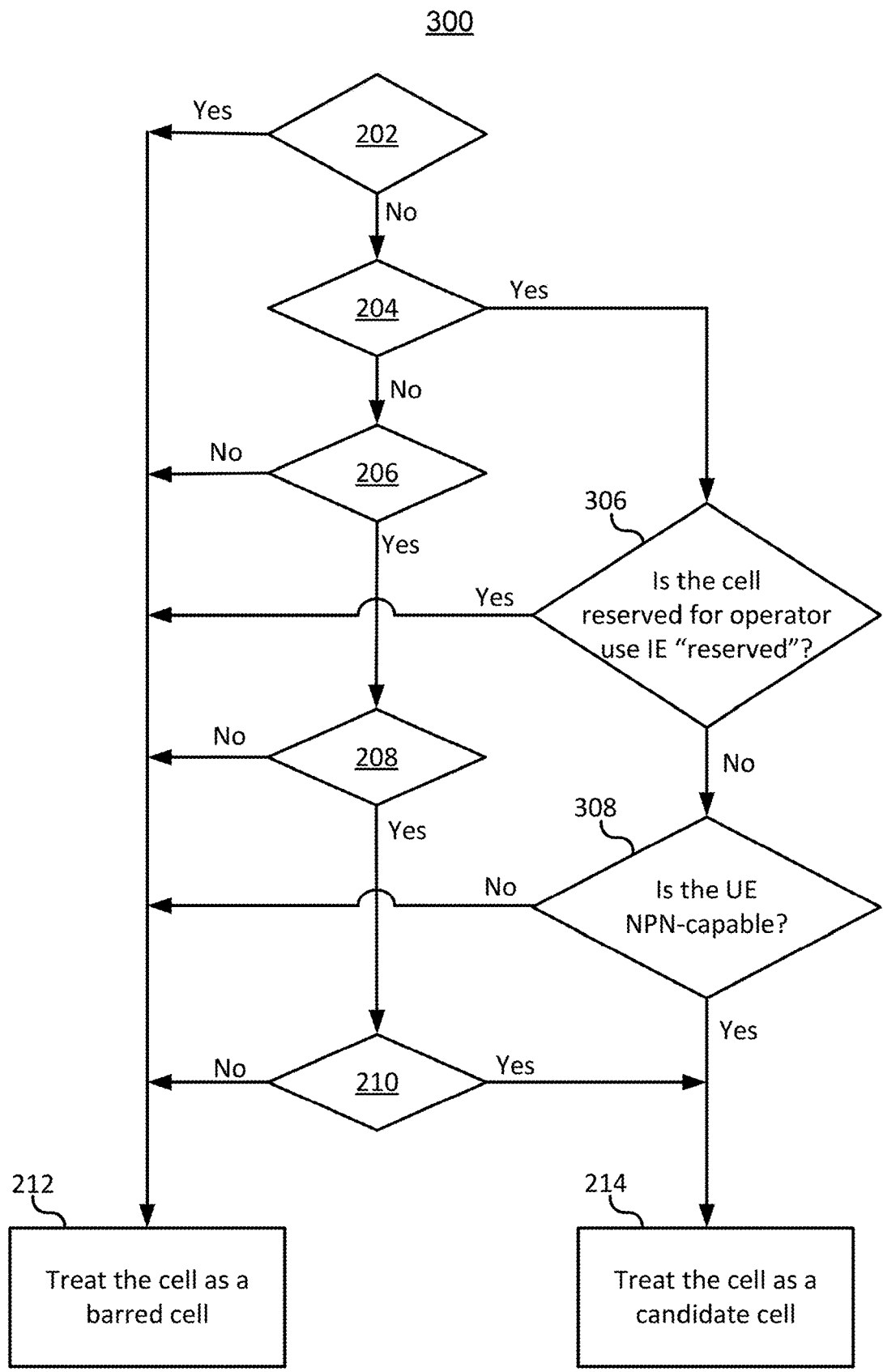
FIG. 3 is a flowchart illustrating a method performed by a UE for determining whether to treat a cell as a candidate cell or a barred cell according to another example implementation of the present disclosure.

FIG. 3 is a flowchart illustrating a method 300 performed by a UE for determining whether to treat a cell as a candidate cell or a barred cell according to another example implementation of the present disclosure. The method 300 may be another implementation of the action 106 illustrated in FIG. 1. Blocks with the same reference numerals as in FIG. 2 can be referred to as the description about FIG. 2. For example, description about actions 202, 204, 206, 208, 210, 212 and 214 in FIG. 3 may be referred to actions 202, 204, 206, 208, 210, 212 and 214, respectively, in FIG. 2. In action 204, the UE may check the cell reserved for other use IE. If the cell reserved for other use IE is "not true," the UE may perform action 206. If the cell reserved for other use IE is "true," the UE may perform action 306 to check the cell reserved for operator use IE. If the cell reserved for operator use IE is "reserved," the UE may perform action 212 to treat the cell as a barred cell. If the cell reserved for operator use IE is not "reserved," the UE may perform action 308 to check whether the UE is NPN-capable. If the UE is not NPN-capable, the UE may perform action 212 to treat the cell as a barred cell. If the UE is NPN-capable, the UE may perform action 214 to treat the cell as a candidate cell. The actions illustrated in FIG. 3 should not be construed as necessarily order dependent. The order in which the process is described is not intended to be construed as a limitation. For example, action 308 may be performed before action 306 in one implementation.

In one implementation, the UE is not NPN-capable if the UE only supports the legacy network (without NPN features), the UE does not support NPN features, or the UE only supports legacy features (e.g., before Rel-16) excluding NPN features. In one implementation, the UE is not NPN-capable if the UE has a registered (or selected) PLMN and supports a network including the NPN feature. In one implementation, the UE is NPN-capable if the UE has a registered (or selected) SNPN or a registered (or selected) PNI-NPN.

Figure 4:
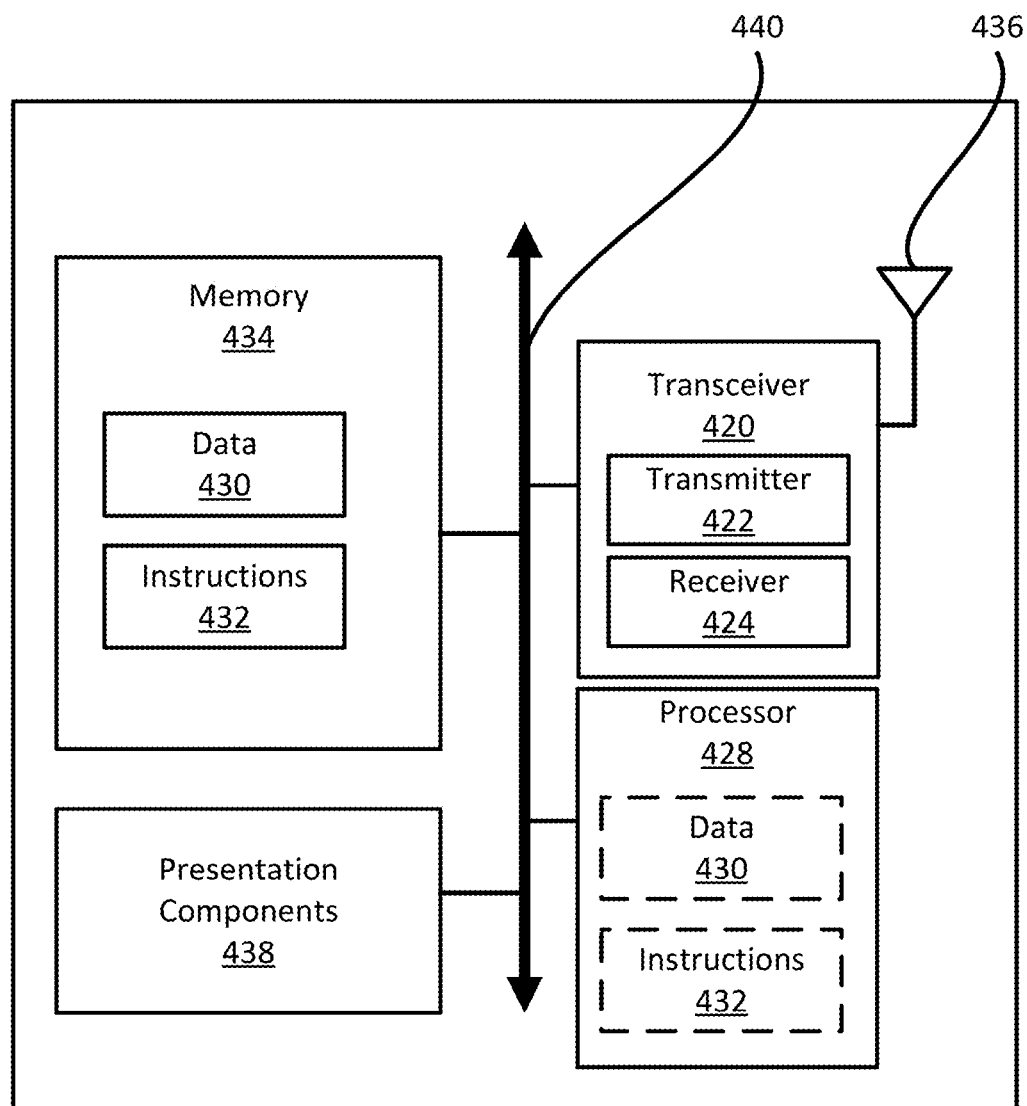
FIG. 4 is a block diagram illustrating a node for wireless communication in accordance with various aspects of the present disclosure.

FIG. 4 is a block diagram illustrating a node 400 for wireless communication in accordance with various aspects of the present disclosure. As illustrated in FIG. 4, a node 400 may include a transceiver 420, a processor 428, a memory 434, one or more presentation components 438, and at least one antenna 436. The node 400 may also include a radio frequency (RF) spectrum band module, a BS communications module, a network communications module, and a system communications management module, Input/Output (I/O) ports, I/O components, and a power supply (not illustrated in FIG. 4).

Each of the components may directly or indirectly communicate with each other over one or more buses 440. The node 400 may be a UE or a BS that performs various functions disclosed with reference to FIGS. 1 through 3.

The transceiver 420 has a transmitter 422 (e.g., transmitting/transmission circuitry) and a receiver 424 (e.g., receiving/reception circuitry) and may be configured to transmit and/or receive time and/or frequency resource partitioning information. The transceiver 420 may be configured to transmit in different types of subframes and slots including but not limited to usable, non-usable and flexibly usable subframes and slot formats. The transceiver 420 may be configured to receive data and control channels.

The node 400 may include a variety of computer-readable media. Computer-readable media may be any available media that may be accessed by the node 400 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 434 may include computer-storage media in the form of volatile and/or non-volatile memory. The memory 434 may be removable, non-removable, or a combination thereof. Example memory may include solid-state memory, hard drives, optical-disc drives, etc. As illustrated in FIG. 4, the memory 434 may store computer-readable and/or computer-executable instructions 432 (e.g., software codes) that are configured to, when executed, cause the processor 428 to perform various functions disclosed herein, for example, with reference to FIGS. 1 through 3. Alternatively, the instructions 432 may not be directly executable by the processor 428 but may be configured to cause the node 400 (e.g., when compiled and executed) to perform various functions disclosed herein.

The processor 428 (e.g., having processing circuitry) may include an intelligent hardware device, e.g., a Central Processing Unit (CPU), a microcontroller, an ASIC, etc. The processor 428 may include memory. The processor 428 may process the data 430 and the instructions 432 received from the memory 434, and information transmitted and received via the transceiver 420, the base band communications module, and/or the network communications module. The processor 428 may also process information to send to the transceiver 420 for transmission via the antenna 436 to the network communications module for transmission to a CN.

One or more presentation components 438 may present data indications to a person or another device. Examples of presentation components 438 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A user equipment (UE) comprising:
  one or more non-transitory computer-readable media containing computer-executable instructions embodied therein; and
  at least one processor coupled to the one or more non-transitory computer-readable media, the at least one processor configured to execute the computer-executable instructions to:
  receive a master information block (MIB) from a cell, the MIB including a cell barred information element (IE);
  receive a system information block type 1 (SIB1) from the cell, the SIB1 including a first non-public network (NPN) identity (ID), a first cell reserved for operator use IE associated with the first NPN ID, and a cell reserved for other use IE; and
  determine whether to treat the cell as a barred cell or a candidate cell for cell selection or cell reselection procedures based on the cell barred IE, the first cell reserved for operator use IE, and the cell reserved for other use IE,
  wherein the UE treats the cell as the candidate cell for the cell selection or cell reselection procedures when the cell barred IE is "not barred", the cell reserved for other use IE is not "true", the first cell reserved for operator use IE is "reserved", the first NPN ID matches a registered stand-alone NPN (SNPN) ID of the UE, and an access ID of the UE is 11 or 15.

2. The UE of claim 1, wherein the first NPN ID is one of an SNPN ID and a public network integrated NPN (PNI-NPN) ID.

3. The UE of claim 2, wherein the SNPN ID includes a public land mobile network (PLMN) ID and a network ID (NID).

4. The UE of claim 2, wherein the PNI-NPN ID includes a public land mobile network (PLMN) ID and a closed access group (CAG) ID.

5. The UE of claim 1, wherein the SIB1 further includes a second NPN ID and a second cell reserved for operator use IE associated with the second NPN ID.

6. The UE of claim 5, wherein the cell barred IE is common for a first NPN indicated by the first NPN ID and a second NPN indicated by the second NPN ID.

7. The UE of claim 1, wherein the SIB1 further includes a first tracking area code (TAC) associated with the first NPN ID.

8. The UE of claim 1, wherein the SIB1 further includes a list of public land mobile network (PLMN) IDs.

9. The UE of claim 8, wherein the cell barred IE and the cell reserved for other use IE are common for all PLMNs indicated by the list of PLMN IDs.

10. The UE of claim 1, wherein the UE treats the cell as the barred cell when the cell barred IE is "not barred", the cell reserved for other use IE is not "true", the first cell reserved for operator use IE is "reserved", the first NPN ID matches the registered SNPN ID of the UE, and the access ID of the UE is 0, 1, 2, 12, 13 or 14.

11. A method for wireless communication performed by a user equipment (UE), the method comprising:
  receiving a master information block (MIB) from a cell, the MIB including a cell barred information element (IE);
  receiving a system information block type 1 (SIB1) from the cell, the SIB1 including a first non-public network (NPN) identity (ID), a first cell reserved for operator use IE associated with the first NPN ID, and a cell reserved for other use IE; and
  determining whether to treat the cell as a barred cell or a candidate cell for cell selection or cell reselection procedures based on the cell barred IE, the first cell reserved for operator use IE, and the cell reserved for other use IE,
  wherein the UE treats the cell as the candidate cell for the cell selection or cell reselection procedures when the cell barred IE is "not barred", the cell reserved for other use IE is not "true", the first cell reserved for operator use IE is "reserved", the first NPN ID matches a registered stand-alone NPN (SNPN) ID of the UE, and an access ID of the UE is 11 or 15.

12. The method of claim 11, wherein the first NPN ID is one of an SNPN ID and a public network integrated NPN (PNI-NPN) ID.

13. The method of claim 12, wherein the SNPN ID includes a public land mobile network (PLMN) ID and a network ID (NID).

14. The method of claim 12, wherein the PNI-NPN ID includes a public land mobile network (PLMN) ID and a closed access group (CAG) ID.

15. The method of claim 11, wherein the SIB1 further includes a second NPN ID and a second cell reserved for operator use IE associated with the second NPN ID.

16. The method of claim 15, wherein the cell barred IE is common for a first NPN indicated by the first NPN ID and a second NPN indicated by the second NPN ID.

17. The method of claim 11, wherein the SIB1 further includes a first tracking area code (TAC) associated with the first NPN ID.

18. The method of claim 11, wherein the SIB1 further includes a list of public land mobile network (PLMN) IDs.

19. The method of claim 18, wherein the cell barred IE and the cell reserved for other use IE are common for all PLMNs indicated by the list of PLMN IDs.

20. The method of claim 11, wherein the UE treats the cell as the barred cell when the cell barred IE is "not barred", the cell reserved for other use IE is not "true", the first cell reserved for operator use IE is "reserved", the first NPN ID matches the registered SNPN ID of the UE, and the access ID of the UE is 0, 1, 2, 12, 13 or 14.

* * * * *